United States Patent [19]

Tanaka et al.

[11] Patent Number: 5,003,614
[45] Date of Patent: Mar. 26, 1991

[54] IMAGE PROCESSING SYSTEM

[75] Inventors: Yuzuru Tanaka, Sapporo; Eisaku Tatsumi, Yokohama; Hiroshi Tanioka; Yoshinori Kato, both of Tokyo, all of Japan

[73] Assignee: Canon Kabushiki Kaisha, Tokyo, Japan

[21] Appl. No.: 408,429

[22] Filed: Sep. 15, 1989

Related U.S. Application Data

[63] Continuation of Ser. No. 144,632, Jan. 12, 1988, abandoned, which is a continuation of Ser. No. 749,933, Jun. 27, 1985, abandoned.

[30] Foreign Application Priority Data

Jun. 28, 1984 [JP] Japan ................................ 59-133911
Jun. 28, 1984 [JP] Japan ................................ 59-133912
Jun. 28, 1984 [JP] Japan ................................ 59-133913
Jun. 28, 1984 [JP] Japan ................................ 59-133914

[51] Int. Cl.$^5$ .............................................. G06K 9/46
[52] U.S. Cl. ....................................... 382/18; 382/48; 382/56
[58] Field of Search ................... 382/9, 18, 40, 45, 48, 382/51, 57, 61, 67; 358/452, 453, 462–464

[56] References Cited

U.S. PATENT DOCUMENTS 4,069,511 1/1978 Lezke .................................. 364/200
4,377,803 3/1983 Lotspiech et al. ...................... 382/9
4,741,045 4/1988 Denning ................................ 382/9

FOREIGN PATENT DOCUMENTS 0083989 1/1983 European Pat. Off. .
0098959 1/1984 European Pat. Off. .

Primary Examiner—David K. Moore
Assistant Examiner—Jose L. Couso
Attorney, Agent, or Firm—Fitzpatrick, Cella, Harper & Scinto

[57] ABSTRACT

An image processing system has an image processing function for use in, particularly, a word processor, a copying machine, or a facsimile apparatus. This apparatus includes an image reader to read and input image information; a keyboard to input character information; a recognizing unit for recognizing the character information in the image information inputted by the image reader; and an image processor for performing the editing of characters on the basis of the result by the recognizing unit. The character information includes lines of character strings, paragraphs in document information, spaces between words, spaces between characters, hyphens, or positions of words. The image processor means performs the image editing processes such as right alignment, deletion, rewriting, insertion, search, and the like with respect to the character information recognized by the recognizing unit. With this system, the character data inputted from the keyboard and the image data read by the image reader can be processed at the same level, so that the new documents can be freely produced.

10 Claims, 25 Drawing Sheets

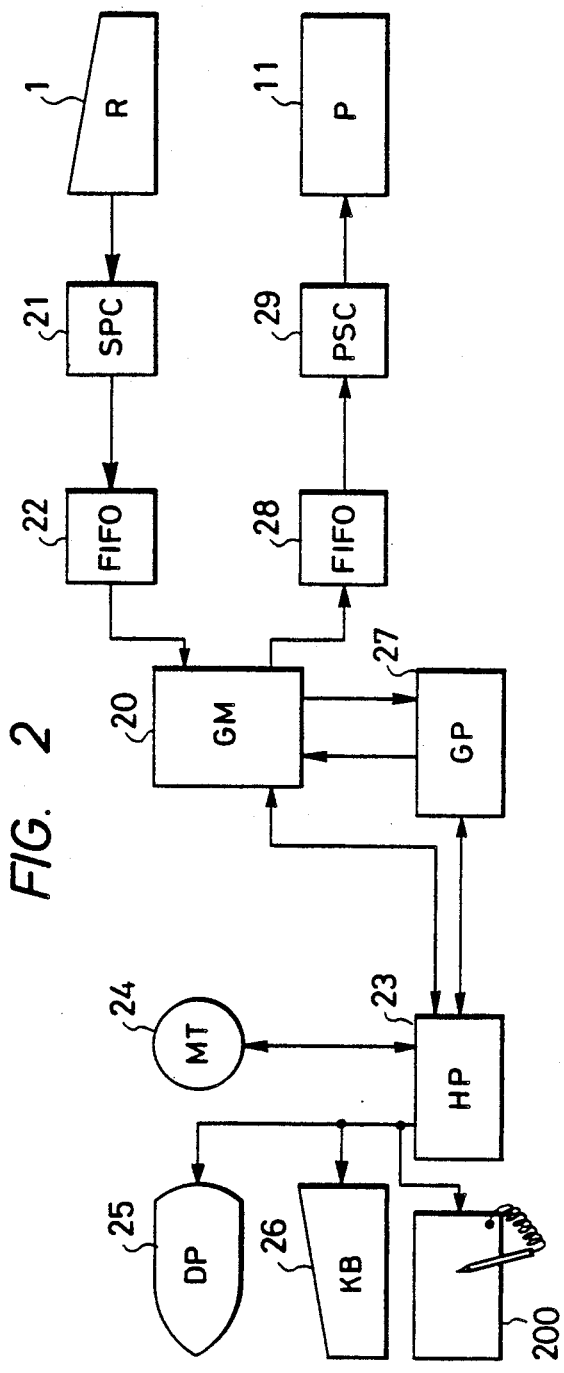
FIG. 2
FIG. 3-1
FIG. 3-2
One important aspect of VLSI, not covered in this Part is reliability. The reader is referred to [48] and Section 10 of the bibliography for further sources. Moreover, Sections 3 and 4 of the bibliography contain references on MOSFET processing technologies and VLSI related topics respectively.

One important aspect of VLSI, not covered in this Part is reliability. The reader is referred to [48] and Section 10 of the bibliography for further sources. Moreover, Sections 3 and 4 of the bibliography contain references on MOSFET processing technologies and VLSI related topics respectively.

FIG. 12

Clark, K.L. 1978 Negation as failure, In Logic and Data Bases (H. Gallaire and J. Minker, Eds.), Plenum Press. New Yark, N.Y., 1978, 293-322.

FIG. 13-1

| NO | SPW | B | E | SPW | B | E | SPW | B | E |
|---|---|---|---|---|---|---|---|---|---|
| 1 | 29 | 1 | 29 | 27 | 1 | 29 | 31 | 1 | 31 |
| 2 | 5 | 43 | 47 | 2 | 43 | 44 | 4 | 45 | 48 |
| 3 | 4 | 59 | 62 | 5 | 59 | 63 | 3 | 61 | 68 |
| 4 | 6 | 75 | 80 | 4 | 76 | 79 | 20 | 78 | 97 |
| 5 | 5 | 93 | 97 | 4 | 93 | 96 | 3 | 110 | 112 |
| 6 | 6 | 111 | 116 | 25 | 109 | 133 | 7 | 125 | 131 |
| 7 | 25 | 122 | 146 | 6 | 141 | 146 | 5 | 143 | 147 |
| 8 | 9 | 160 | 168 | 8 | 160 | 162 | 6 | 161 | 166 |
| 9 | 7 | 173 | 179 | 22 | 173 | 194 | 25 | 172 | 196 |
| 10 | 8 | 193 | 200 | 4 | 209 | 212 | 7 | 211 | 217 |
| 11 | 45 | 205 | 249 | 5 | 225 | 229 | 8 | 222 | 229 |
| 12 | 9 | 255 | 263 | 6 | 241 | 246 | 9 | 242 | 250 |
| 13 | 6 | 274 | 279 | 4 | 258 | 261 | 11 | 255 | 265 |
| 14 | 7 | 291 | 297 | 8 | 274 | 287 | 26 | 271 | 296 |
| 15 | 5 | 307 | 311 | 6 | 290 | 295 | 7 | 307 | 313 |
| 16 | 9 | 324 | 352 | 6 | 307 | 312 | 6 | 325 | 330 |
| 17 | 41 | 338 | 378 | 19 | 325 | 343 | 5 | 340 | 344 |
| 18 | 4 | 392 | 395 | 6 | 357 | 362 | 8 | 357 | 364 |
| 19 | 3 | 408 | 410 | 2 | 375 | 376 | 31 | 370 | 400 |
| 20 | 4 | 423 | 426 | 21 | 390 | 410 | 4 | 411 | 414 |
| 21 | 6 | 440 | 445 | 1 | 415 | 415 | 6 | 427 | 432 |
| 22 | 3 | 455 | 462 | 9 | 424 | 432 | 4 | 444 | 447 |
| 23 | 4 | 473 | 476 | 23 | 437 | 459 | 7 | 460 | 466 |
| 24 | 5 | 489 | 493 | 1 | 469 | 469 | 7 | 476 | 482 |
| 25 | 20 | 507 | 526 | 7 | 474 | 480 | 6 | 493 | 498 |
| 26 | 4 | 539 | 542 | 6 | 489 | 494 | 11 | 509 | 519 |
| 27 | 23 | 554 | 576 | 4 | 499 | 502 | 517 | 524 | 1040 |
| 28 | 4 | 589 | 592 | 4 | 508 | 511 | | | |
| 29 | 7 | 605 | 611 | 4 | 524 | 527 | | | |
| 30 | 4 | 622 | 625 | 5 | 540 | 544 | | | |
| 31 | 6 | 637 | 642 | 9 | 555 | 563 | | | |
| 32 | 6 | 655 | 660 | 27 | 568 | 594 | | | |
| 33 | 6 | 671 | 676 | 3 | 607 | 609 | | | |
| 34 | 6 | 689 | 694 | 4 | 622 | 625 | | | |
| 35 | 28 | 700 | 727 | 11 | 637 | 647 | | | |
| 36 | 5 | 737 | 741 | 9 | 652 | 660 | | | |
| 37 | 1 | 743 | 748 | 11 | 668 | 678 | | | |
| 38 | 17 | 755 | 771 | 26 | 684 | 709 | | | |
| 39 | 3 | 786 | 788 | 5 | 722 | 726 | | | |
| 40 | 4 | 802 | 805 | 7 | 736 | 742 | | | |
| 41 | 4 | 820 | 823 | 5 | 754 | 758 | | | |
| 42 | 2 | 836 | 837 | 2 | 763 | 764 | | | |
| 43 | 19 | 852 | 870 | 3 | 771 | 773 | | | |
| 44 | 5 | 885 | 889 | 3 | 779 | 781 | | | |
| 45 | 17 | 920 | 936 | 4 | 786 | 789 | | | |
| 46 | 1 | 952 | 952 | 20 | 804 | 823 | | | |
| 47 | 7 | 967 | 993 | 5 | 837 | 841 | | | |
| 48 | 41 | 1000 | 1040 | 6 | 852 | 857 | | | |
| | | | | 5 | 869 | 873 | | | |
| | | | | 5 | 885 | 889 | | | |
| | | | | 8 | 901 | 908 | | | |
| | | | | 127 | 914 | 1040 | | | |

FIG. 13-2

```
SPW  DOSU
  1   4....
  2   4....
  3   7.......
  4  21.....................
  5  16................
  6  19...................
  7  11...........
  8   7.......
  9   7.......
 10   0
 11   4....
 12   0
 13   0
 14   0
 15   0
 16   0
 17   2..
 18   0
 19   2..
 20   3...
 21   1.
 22   1.
 23   2..
 24   0
 25   3...
 26   2..
 27   2..
 28   1.
 29   1.
 30   0
 31   2..
 32   0
 33   0
 34   0
 35   0
 36   0
 37   0
 38   0
 39   0
 40   0
 41   2..
 42   0
 43   0
 44   0
 45   1.
```

FIG. 13-3

```
SPW  DOSU
  1   0
  2   5.....
  3  11...........
  4  15...............
  5  19...................
  6  15...............
  7  12............
  8   8........
  9   5.....
 10   4....
 11   1.
 12   1.
 13   0
 14   0
 15   0
 16   1.
 17   1.
 18   1.
 19   2..
 20   2..
 21   2..
 22   1.
 23   1.
 24   2..
 25   2..
 26   2..
 27   2..
 28   1.
 29   1.
 30   1.
 31   1.
 32   1.
 33   0
 34   0
 35   0
 36   0
 37   0
 38   0
 39   0
 40   1.
 41   1.
 42   1.
 43   0
 44   0
 45   0
```

FIG. 15-1

| NO | LEFT | RIGHT | BSLN |
|---|---|---|---|
| 1 | 29 | 122 | 39 |
| 2 | 146 | 205 | 39 |
| 3 | 249 | 338 | 39 |
| 4 | 378 | 507 | 39 |
| 5 | 526 | 554 | 39 |
| 6 | 576 | 700 | 39 |
| 7 | 727 | 755 | 39 |
| 8 | 771 | 852 | 39 |
| 9 | 870 | 920 | 39 |
| 10 | 936 | 1000 | 39 |
| 11 | 27 | 109 | 73 |
| 12 | 133 | 173 | 73 |
| 13 | 194 | 325 | 73 |
| 14 | 343 | 390 | 73 |
| 15 | 410 | 437 | 73 |
| 16 | 459 | 568 | 73 |
| 17 | 594 | 684 | 73 |
| 18 | 709 | 804 | 73 |
| 19 | 823 | 914 | 73 |
| 20 | 31 | 78 | 105 |
| 21 | 97 | 172 | 105 |
| 22 | 196 | 271 | 105 |
| 23 | 296 | 370 | 105 |
| 24 | 400 | 324 | 105 |

FIG. 15-2

Clark, K.L. 1978 Negation as Failure, In Logic and Data Bases (H. Gallaire and J. Minker, Eds.), Plenum Press. New Yark, N.Y., 1978, 293-322.

FIG. 16A
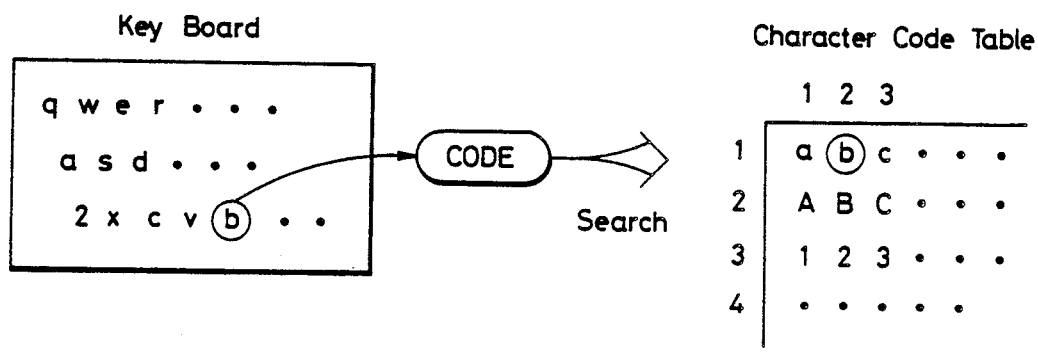
FIG. 16B
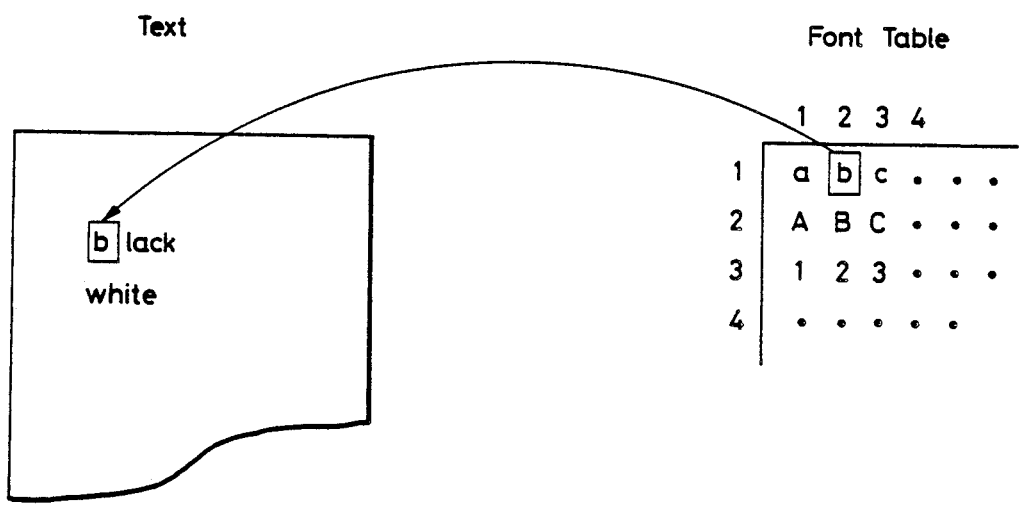
FIG. 16C
Font Table
```
A B C D E F G H I J K L M N O P Q R S T U V W X Y Z
a b c d e f g h i j k l m n o p q r s t u v w x y z
0 1 2 3 4 5 6 7 8 9 [ ] ( ) , .
```

FIG. 17

One important aspect of VLSI, not covered in this Part is reliability. The reader is referred to [48] and Section 10 of the bibliography for further sources.

FIG. 18A
RIGHT ALIGNMENT

One impotant aspect of VLSI, not covered in this Part is reilability. The reader is referred to [48] and Section 10 of the bibliography for further sources.

FIG. 18B
DELETE

One impotant aspect of LSI, not covered in this Part is reilability. The reader is referred to [48] and Section 10 of the bibliography for further sources.

FIG. 18C
REWRITE

One impotant aspect of ULSI, not covered in this Part is reilability. The reader is referred to [48] and Section 10 of the bibliography for further sources.

FIG. 18D
INSERT

One impotant aspect of VLSI, not covered in this Part is reilability. The reader is referred to [408] and Section 10 of the bibliography for further sources.

One important aspect of VLSI, not covered in this Part is reliability. The reader is referred to [48] and Section 10 of the bibliography for further sources. Moreover, Sections 3 and 4 of the bibliography contain references on MOSFET processing technologies and VLSI related topics respectively.

FIG. 24
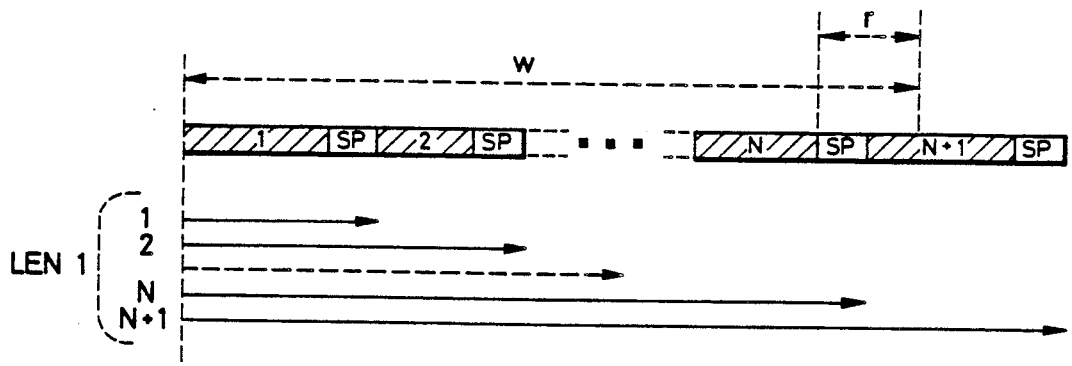
FIG. 25
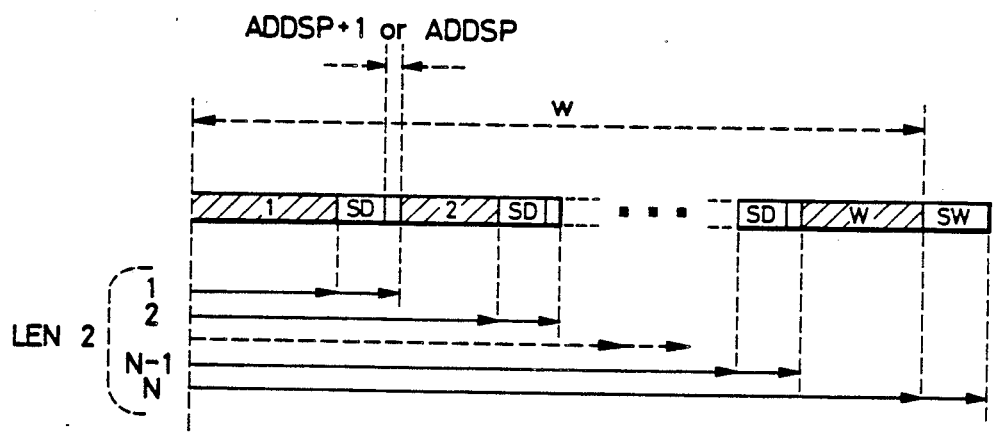
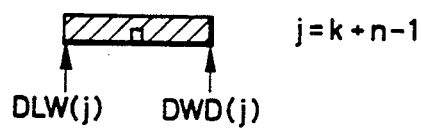
FIG. 26
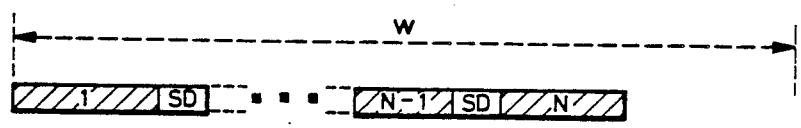

FIG. 29-1

One important aspect of VLSI, not covered in this Part is reliability. The reader is referred to [48] and Section 10 of the bibliography for further sources. Moreover. Sections 3 and 4 of the bibliography contain references on MOSFET processing technologies and VLSI related topics respectively.

FIG. 29-2

One important aspect of VLSI, not covered in this Part is reliability. The reader is referred to [48] and Section 10 of the bibliography for further sources. Moreover. Sections 3 and 4 of the bibliography contain references on MOSFET processing technologies and VLSI related topics respectively.

IMAGE PROCESSING SYSTEM

This application is a continuation of application Ser. No. 07/144,632 filed Jan. 12, 1988, now abandoned, which was a continuation of application Ser. 06/749,933, filed June 27, 1985, now abandoned.

BACKGROUND OF THE INVENTION

1. Field of the Invention

The present invention relates to an image processing system having an image processing function and, more particularly, to an image processing system which recognizes the presence of word areas in an image (document) and lines, and detects spaces between words, positions of characters and the like and further which can perform the rewriting, editing, retrieval, or the like of documents.

2. DESCRIPTION OF THE PRIOR ART

Image processing systems, for example, word processors have at present various processing capabilities and are indispensable to produce and edit documents. A keyboard, an OCR or the like is mainly used as means for inputting a document. In general, input characters are converted to code data corresponding to the internal codes (ASCII, EBCDIC, JI, etc.) of the system used and thereafter they are subjected to processing such as storage, rewriting, retrieval, editing, or the like.

Documents ordinarily contain a table, a graph, a picture, a photograph, or the like as well as characters. A word processor for producing and editing documents by synthesizing those graphic data and sentences has been also considered. In this case, characters, tables, graphs, pictures, photographs, or the like are stored as different data formats, respectively. For example, characters are stored as character codes; tables and graphs are stored as data suitable to describe them; pictures are stored as graphic data or images., photographs are stored as images; and the like.

Apart from the production of new documents, in the case where a great amount of documents which have already been typed are inputted and used as a data base, particularly, it takes an extremely long time and is troublesome to input primary information by typing on a keyboard.

On the other hand, as other office machines having a function to input or output documents, a copying machine or a facsimile apparatus is known. Although copying machines can input information at a high speed, they merely output the inputted documents as they are or output the documents after they were enlarged or reduced, but the copying machines do not have the processing capability to process the inputted documents such as a word processing capability, or the function to store or retrieve the documents.

SUMMARY OF THE INVENTION

The present invention is made in consideration of the above-mentioned points and is intended to eliminate the foregoing drawbacks.

It is an object of the present invention to provide an image processing system which can process various information such as documents, pictures, tables, or the like without distinguishing them and which can easily perform editing such as deletion, addition or the like of this information.

Another object of the invention is to provide an image processing system which can easily input the documents that have already been typed and which also can edit these documents in a manner similar to the code data inputted from a keyboard.

Still another object of the invention is to provide an image processing system in which the input data from the keyboard and the image data read out from a reader can be processed at the same level.

Still another object of the invention is to provide an image processing system for copying machines, facsimile apparatuses or the like in which the copying machines or facsimile apparatuses are allowed to have a high function and thereby enabling input information to be edited.

Still another object of the invention is to recognize lines in an image and to obtain the lines from a histogram of a black mesh for every pixel line.

Still another object of the invention is to obtain a base line of each character line from a frequency mean value and a standard deviation or from a difference between frequencies.

Still another object of the invention is to remove the noise upon discrimination of each character line.

Still another object of the invention is to extract a space between characters and a space between words.

Still another object of the invention is that in the case where three or more spaces each having a width over a threshold level continuously appear in one line, it is intended not to regard the second space as the space between words.

Still another object of the invention is to provide an image processing system which can perform editing such as the insertion, deletion or the like of characters of a text from a character code table or a font table.

Still another object of the invention is to detect a paragraph, recognize a hyphen, convert the length of a line, and recognize the position of a word.

BRIEF DESCRIPTION OF THE DRAWINGS

FIG. 2 is a block diagram showing one example of an image processing system;

FIG. 3-1 is a diagram showing one example of an original image;

FIG. 3-2 is a diagram showing one example of a sentence as an example of the original image;

FIG. 10-1 is an explanatory diagram of parameters upon extraction of a word;

FIG. 10-2(A) and 10-2(B) are explanatory diagrams of the length between words and of the length between characters;

FIG. 10-3 is a diagram showing a projection of an image along an X axis;

FIG. 11-1 is a flowchart in STEP①extraction of a space between characters;

FIG. 11-2 is a flowchart in STEP ②　extraction production of a frequency distribution for the length of a space;

FIG. 12 is a diagram showing an example of an original document;

FIGS. 13-1 and 13-2 are diagrams showing the results of the extraction of the spaces between characters with respect to the original document shown in FIG. 12;

FIG. 13-1 and 13-3 is a diagram showing the result of the execution of the smoothing operation by way of the three-class mean with regard to a frequency distribution;

FIG. 15-1 is a diagram showing the results of extraction of the words;

FIG. 15-2 is a diagram showing the result of the division of the original of FIG. 12 into words;

FIG. 16 A–C show explanatory diagrams of the rewriting of characters of an image text;

FIG. 17 is a diagram showing a sample text;

FIGS. 18-(A) to 18-(D) are diagrams showing the output results of the rewriting process of the document;

FIGS. 20-1 and 20-2 are flowcharts for detection of a paragraph;

FIGS. 23-1 and 23-2 are explanatory diagrams of an algorithm to obtain the positions of the words after the conversion of the line length;

FIG. 24 is an explanatory diagram of calculation of the LEN1;

FIG. 25 is an explanatory diagram of calculation of the LEN2;

FIG. 26 is an explanatory diagram of the distances among respective words in the case where there is no need to justify the right position;

FIG. 29-1 is a diagram showing an example of an original image; and

FIG. 29-2 is a diagram showing the result of the line length conversion of the original image shown in FIG. 29-1.

DETAILED DESCRIPTION OF THE PREFERRED EMBODIMENTS

The present invention will now be described in detail hereinbelow with reference to the drawings. In this invention, an "image" includes character information as well a pattern image and the editing process is performed without distinguishing characters and a pattern image. Also, in this invention, an "image processing system" includes a simple apparatus which performs the image process.

Figure 1:
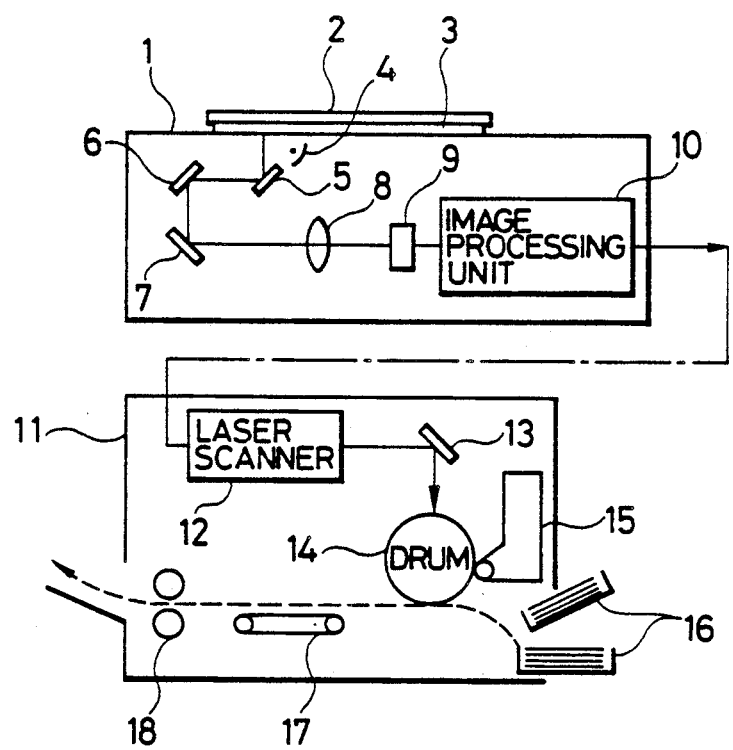
FIG. 1 is a structure diagram of an image processing system.

FIG. 1 is a structure diagram of an image processing apparatus having a reader and a printer to which the present invention can be applied. Reference numeral 1 denotes a reading unit (reader) to read image information from an original and to process this information; 2 is an original cover to press the original; 3 is a platen base on which an original is placed; 4 is an exposing lamp to illuminate the original; 5 to 7 are mirrors to lead an optical path; 8 is an image forming lens to allow the original image to be formed; 9 is a photo sensing device (line sensor (CCD)) to digitally read the image information; and 10 is an image processing unit to perform the image processes or the like according to the present invention for the information read by the photosensing device 9. A numeral 11 denotes an output apparatus (printer) to output the image information derived in the reader 1 and a laser beam printer is used in this embodiment. Reference numeral 12 is a laser scanner to convert the image information read out by the reader 1 to a laser beam; 13 is a mirror to reflect the laser beam and thereby to lead it onto a photo sensitive material drum 14; 15 is a developing device to develop the latent image on the drum 14; 17 is a carrying belt to carry a paper from a paper feed cassette 16; and 18 is a paper discharge roller to discharge the paper.

In the above-mentioned arrangement, the original cover 2 is lifted up, an original is set on the transparent platen base, the optical systems 4 to 9 scan, and image information is sequentially read by the line sensor 9 as the photo sensing device. The image information read is subjected to processing which will be explained later in the image processing unit 10. In the printer 11, the laser beam is modulated in response to a signal from the image processing unit 10 and is scanned by the laser scanner 12 and is exposed onto the photosensitive material drum 14 which is uniformly charged, so that an image is formed thereon. Then, the operations such as the development, copy transfer and the like are performed and the copied image is outputted. The image processing apparatus is not limited to the foregoing arrangement, but another arrangement having an image reader, a printer such as a thermal printer or the like similar to the arrangement of a word processor may be adopted.

Figures 1, 11:
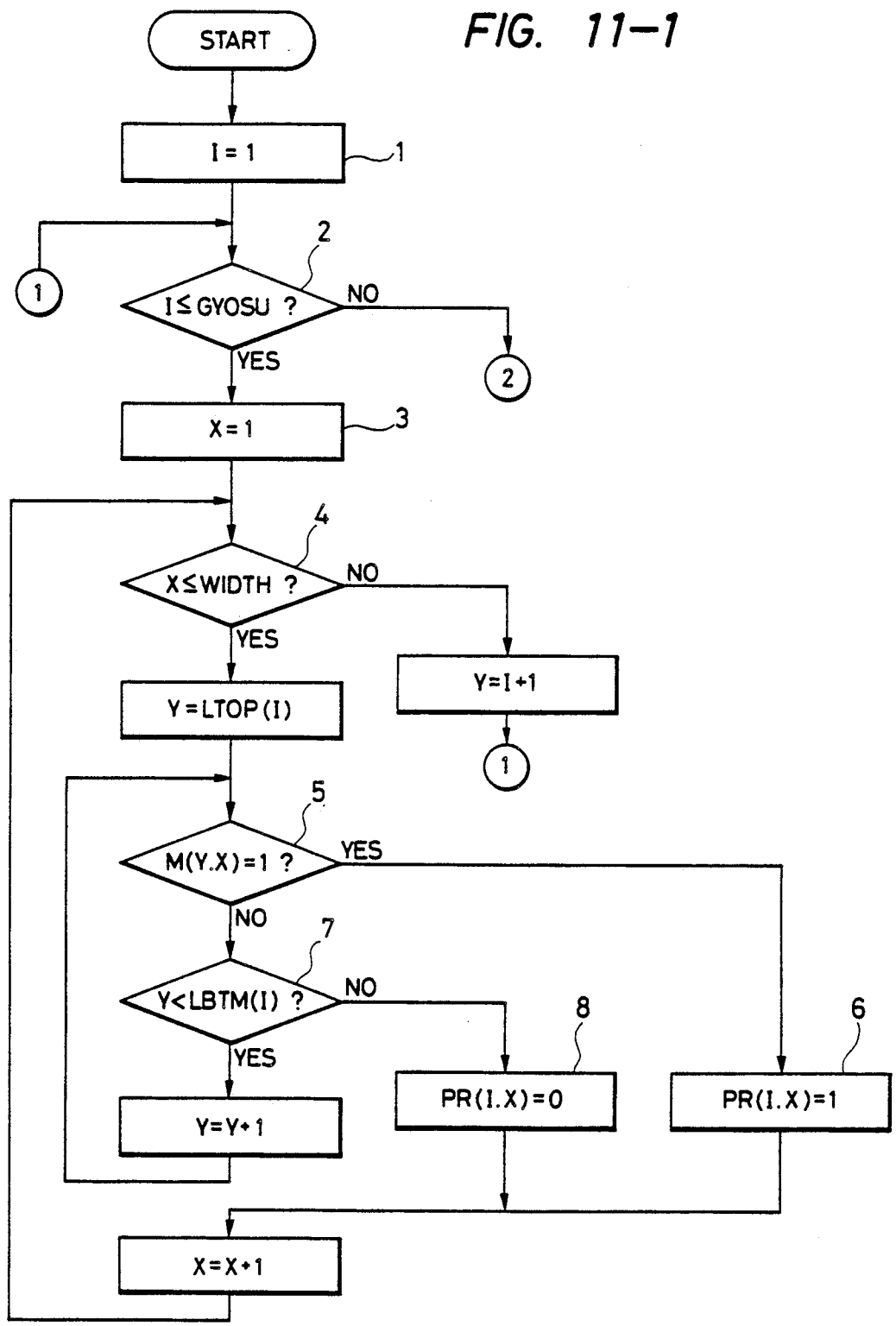
Figures 2, 11:
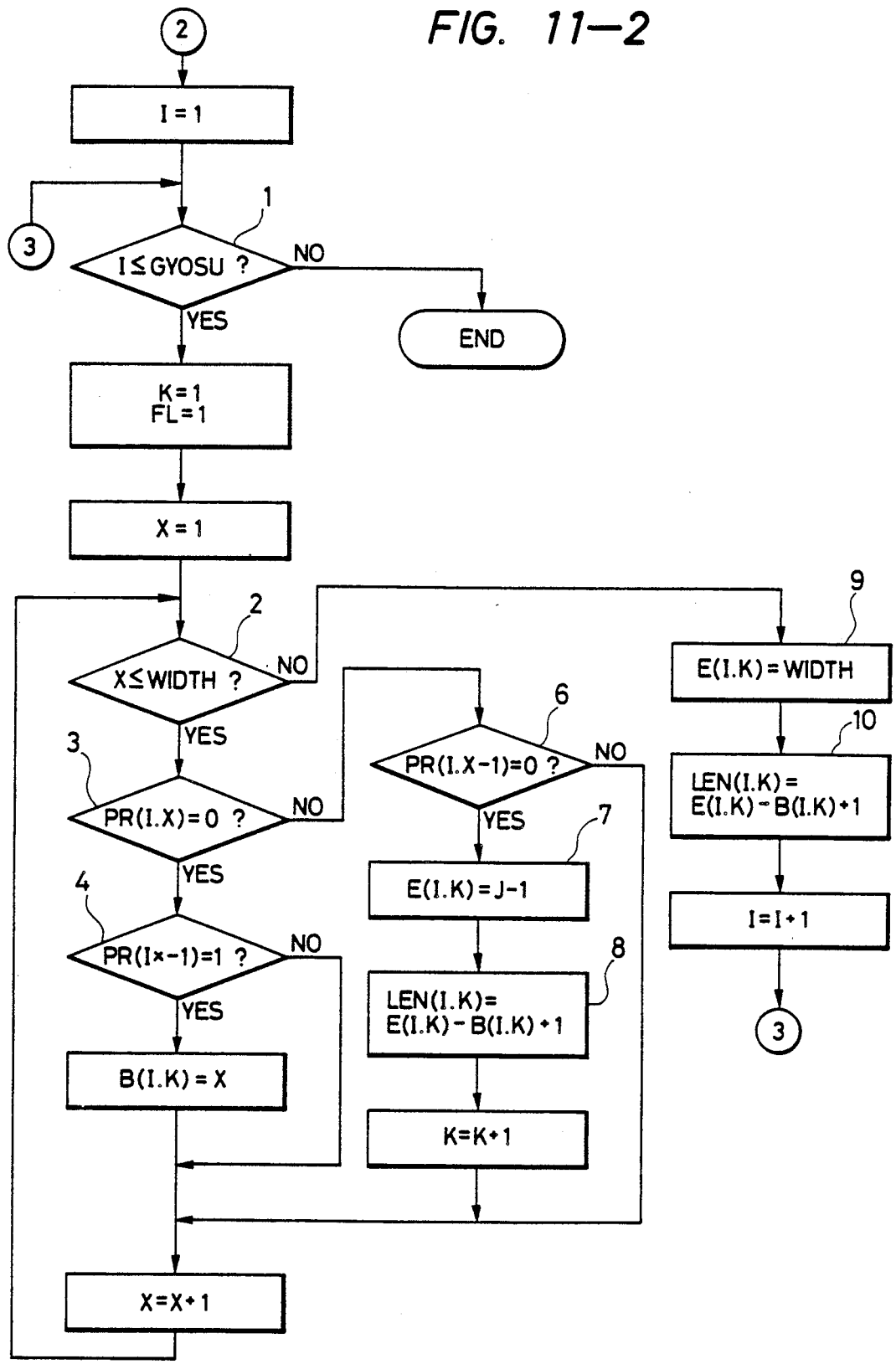

FIG. 2 is a block diagram showing an example of an image processing system having the image processing apparatus with the above-described arrangement. The reader 1 reads the original image and outputs it as a serial data. Since this image data is output at a higher data speed than the access time from an image memory 20, the data width is widened to, for example, sixteen bits by way of a serial-parallel converter 21. Next, in consideration of the refresh cycle of the image memory 20, this image data is stored into the image memory 20 through an FIFO (first-in first-out) buffer 22.

In addition, the image data is stored into an electronic file, a microfilm, a magnetic tape 24, or the like by way of a host processor 23. The image data is displayed by a display 25. On the basis of an input from a keyboard 26, it is possible to instruct a process such as, for example, to insert a new line between existing lines or the like to a dedicated processor 27. The dedicated processor 27 performs the image recognition and image processing in accordance with this instruction. The image data processed is recorded by the printer 11 through an FIFO buffer 28 and a parallel-serial converter 29 conversely to the inputting operation. On one hand, the input data (code) from the keyboard 26 is converted to the image data in the host processor in order to display and output this input data by the display 25; however, the input data can be synthesized with the image data from the reader 1 in the image memory 20. In this case, positions may be designated by the keyboard or a tablet 200.

Further, the image information may be transmitted to a terminal apparatus at a distance using a communication line. The keyboard unit may be replaced by a hand writing character input unit having a tablet and an input pen.

The image processing system with the foregoing arrangement will now be described further in detail.

Figures 1, 10:
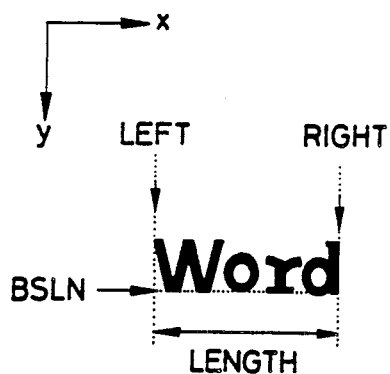
Figures 2A, 10:
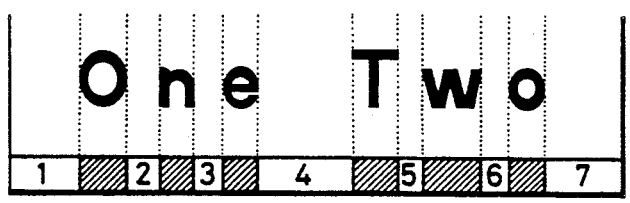
Figures 2B, 10:
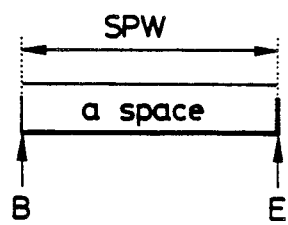
Figures 3, 10:
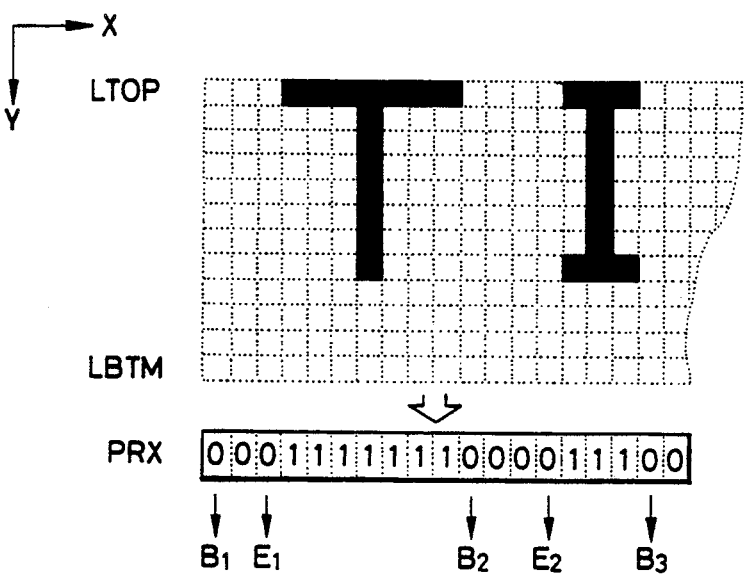

FIG. 3-1 shows an example of an original image (one line). In this diagram, LTOP (Line Top) denotes a y coordinate of the mesh existing in the top portion in the black mesh of one line. In the binarized image signal, a set of pixels which are determined to be black is referred to as a black mesh hereinafter. LBTM (Line Bottom) indicates a y coordinate of the mesh existing in the bottom portion in the black mesh of one line. BSLN (Base Line) represents a base line which coincides with the y coordinate in the bottom portion of capital letters of alphabets. Among these lines, the BSLN is used as a reference of the movement position when characters are moved.

① Determination of the LTOP and LBTM (step A)

Figure 4:
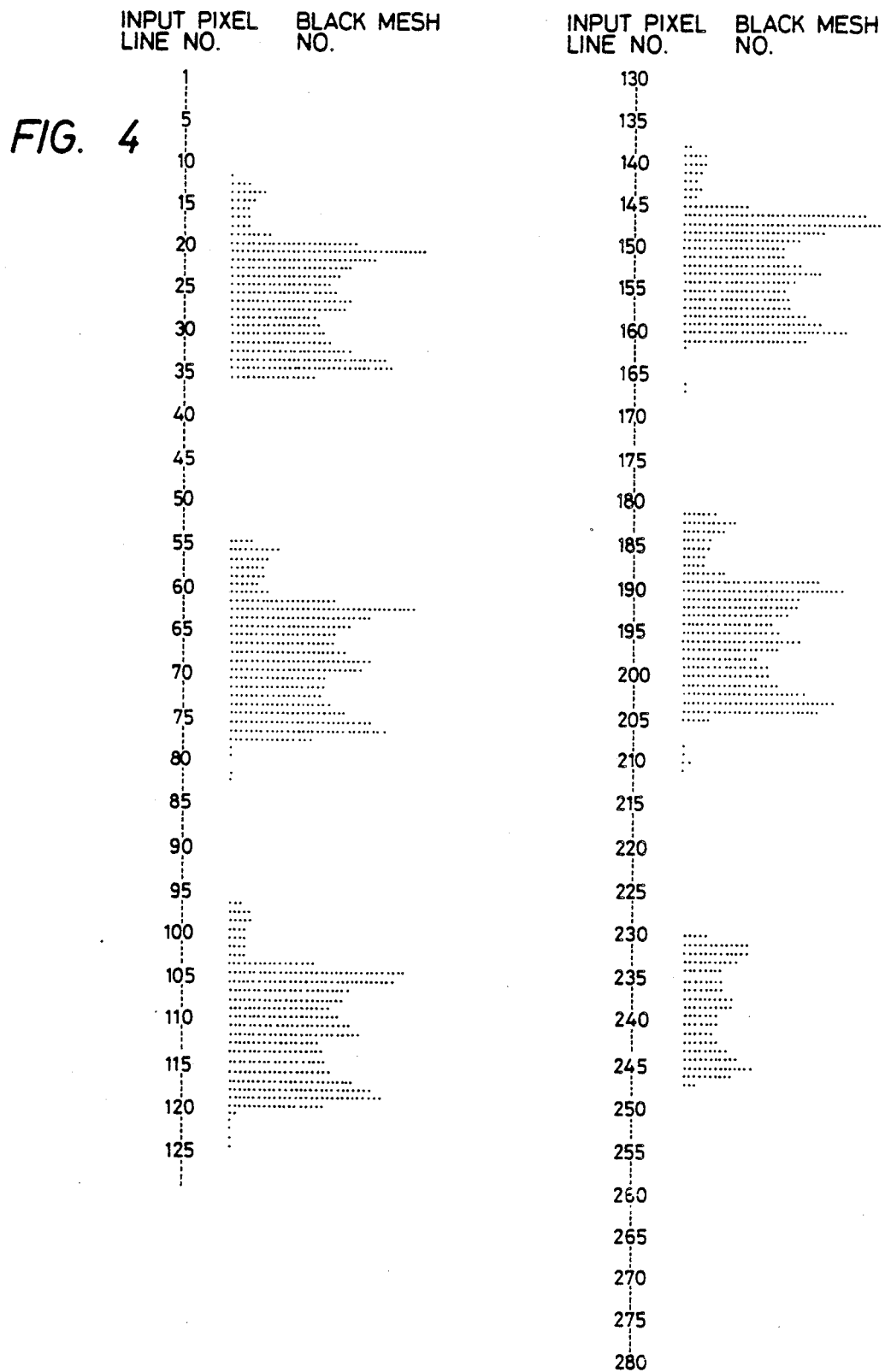
FIG. 4 is a diagram showing a histogram of a black mesh for every input pixel line.

The determination of the LTOP and LBTM will now be explained. It is now assumed that a sentence shown in FIG. 3-2 is an input image. An accumulation frequency of the black mesh for every input pixel line is first obtained. FIG. 4 shows a histogram so derived. It can be seen in FIG. 4 that there are six blocks having large frequencies. These blocks correspond to the portions where characters exist and it is considered that these portions represent lines. The number of these blocks coincides with the number of lines of the input image shown in FIG. 3-2. The algorithm consists of two main portions.

STEP-A: Determination of the LTOP and LBTM from the regions where the frequencies exist.

STEP-B: Removal of the improper points in the LTOP and LBTM derived in STEP-A.

Figure 5:
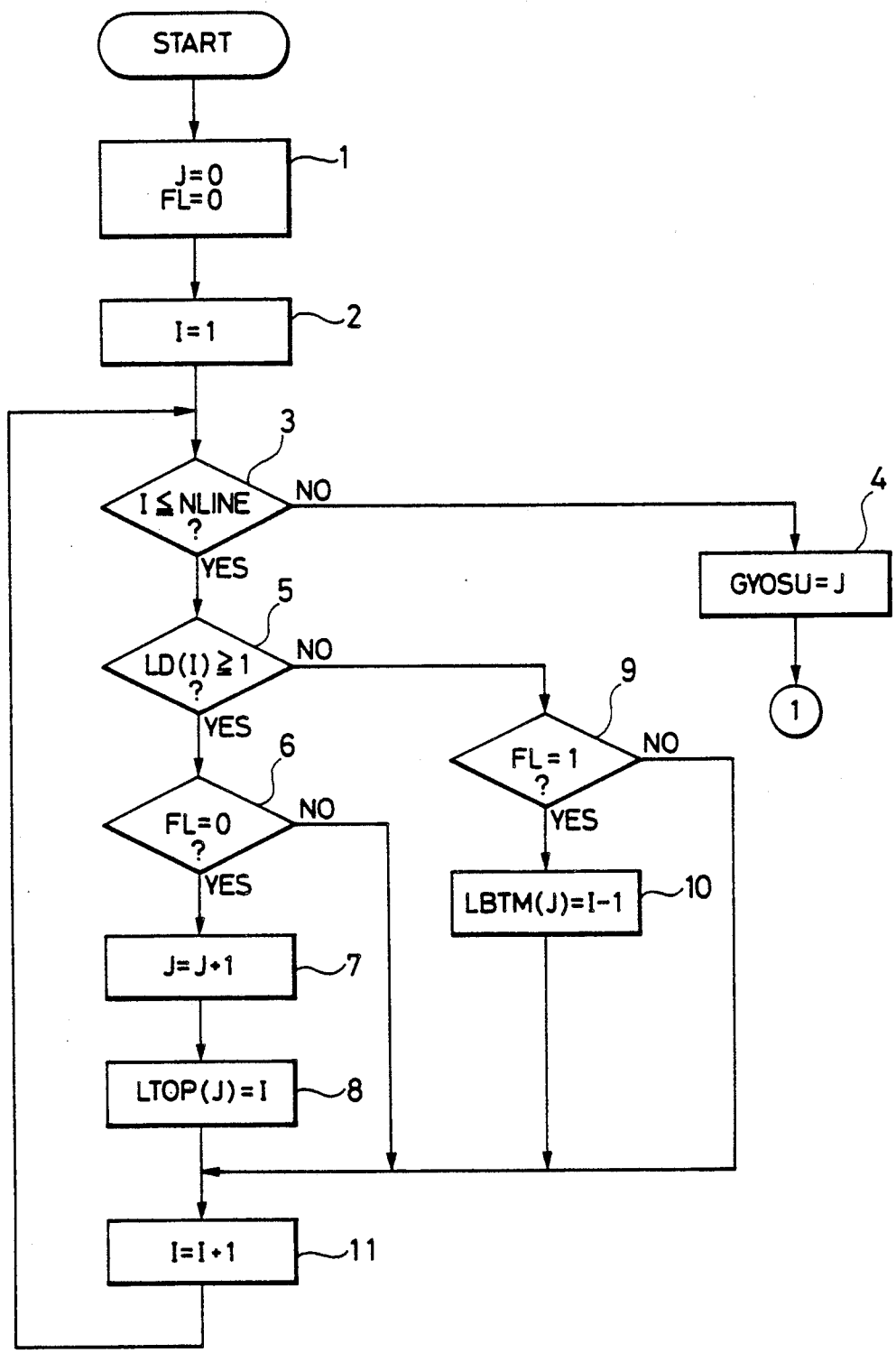
FIG. 5 is a flowchart for determination of the LTOP and LBTM.

The processing algorithm in STEP-A will now be explained with reference to a flowchart for determination of the LTOP and LBTM in FIG. 5. In step 5, a check is made to see if an accumulation number LD(I) of the black mesh in each input pixel line (I line) shown in FIG. 3-2 is over 1 or not. It is now assumed that FL is a flag which is "0" when LD(I−1)=0 and is "1" when LD(I−1)≠0. In the case where the LD (I) is 1 or more and also the LF is "0" in step 6, namely, in the case where the accumulation number of the preceding (I−1) line is 0, the I line can be determined to be the start line of the character lines. Next in step 7, the line number J of the input image is increased by "1". In step 8, the input pixel line number I is stored into the LTOP(J) of the character string of the J line. When the flag FL is not "0" in step 6, in other words, when the black mesh exists even in the preceding pixel line, the I line is not the start line, so that steps 7 and 8 are not executed. Similarly, when the pixel lines to be processed does not satisfy the relation of LD(I) ≧ 1 in step 5, namely, when no black mesh exists, the processing routine is branched to step 9 and the FL is checked. That is, in the case where one or more black meshes exist in the previous line, that line can be decided as the last line, so that in step 10, I−1 is stored into the LBTM(J) as the LBTM of the J-th character line.

The above-mentioned process is executed with respect to all input pixel lines while moving the line to be processed one line by one in step 11. When the end of this process is determined in step 3, the processing routine is branched to step 4, thereby allowing the total line number J of the input image to be stored into GYOSU.

In this way, the LTOP and LBTM are derived with regard to each character line.

Namely, in the foregoing STEP-A, all regions where the frequencies exist in the histogram shown in FIG. 4 are taken out and both ends of each region are set to the LTOP and LBTM. The results of the execution of those processes regarding the input image shown in FIG. 3-2 are shown in portion A of Table 1.

TABLE 1

| LINE NUMBER | LTOP | LBTM | H |
|---|---|---|---|
| A GYOSU = 8 | | | |
| 1 | 6 — | 7 | 2 |
| 2 | 12 — | 41 | 30 |
| 3 | 54 — | 84 | 31 |
| 4 | 96 — | | |
| 5 | 138 — | 168 | 31 |
| 6 | 180 — | 211 | 32 |
| 7 | 218 — | 218 | 1 |
| 8 | 223 — | 252 | 30 |
| B GYOSU = 6 | | | |
| 1 | 12 — | 41 | 30 |
| 2 | 54 — | 84 | 31 |
| 3 | 96 — | 126 | 31 |
| 4 | 138 — | 168 | 31 |
| 5 | 180 — | 211 | 32 |
| 6 | 223 — | 252 | 30 |

In Table 1, H denotes the maximum value (H =LBTM−LTOP+1) of the heights of the characters in one line.

(STEP-B)

The STEP-B will now be explained. In A of Table 1, H=2 and 1 in case of the line numbers 1 and 7 and it is considered that these results were caused due to spurious marks (e.g. dust) in the portions between lines. Thereafter, the STEP-B, the spurious marks removed to prevent that the LTOP and LBTM are determined erroneously due to the influence of the spurious marks. The presence or absence of the spurious marks is discriminated on the basis of whether the H of each line is, for example, below one half of the mean value of the H of all lines or not. Thus, as shown in portion B of Table 1, the lines which were determined to spurious.

Figure 6:
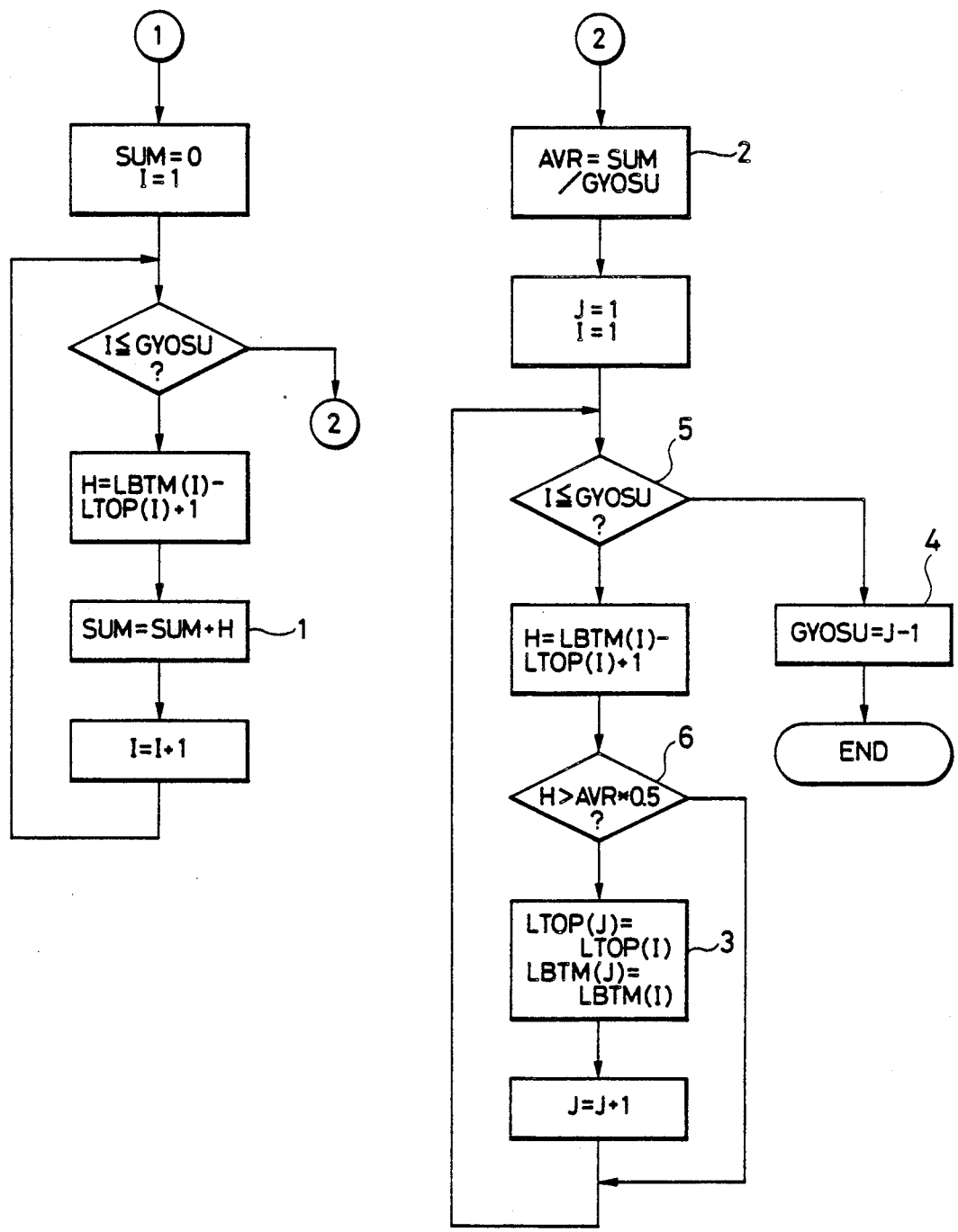
FIG. 6 is a flowchart for removal of errors due to the presence of dust.

FIG. 6 shows a flowchart to remove the dust between lines as mentioned above. The maximum height H of the characters in each line is derived on the basis of the data from ① in the flowchart of FIG. 5. Then, the sum SUM of the heights H of the characters in the respective lines is obtained in step 1. The average AVR of the heights of the characters is calculated in step 2.

In step 6, the maximum height H of the characters of each line is binarized by 0.5 ×AVR and when the H is over 0.5 ×AVR, the processing routine is branched to step 3, thereby replacing the character line. That is, the line numbers 1 and 7 erroneously recognized in portion A of Table 1 are eliminated in this step, so that the resultant lines are accurately recognized as the lines 1 to 6 as shown in portion B of Table 1.

② Determination of the BSLN

It is generally a rare case that most of the characters in one line are occupied by such characters that a part of the character appears at the position lower than the base line, for example, g, i, p, q, y, and the like in an English sentence. Therefore, when the line is divided into three regions I, II and III as shown in FIG. 3-1, it is considered that the accumulation frequencies of the black meshes in each mesh line become small in the sequence of the regions II, I and III, particularly, in the English sentence. Therefore, the base line can be obtained by finding the point where the frequency rapidly increases when the frequency is traced from the LBTM to the LTOP of each line. In case of the line of which no black mesh exists in the region III, the BSLN is made coincide with the LBTM.

The following two methods are proposed as methods of obtaining the base line (BSLN).

Method 1 (M1)

Method by way of the average and standard deviation of the frequencies

Method 2 (M2)

Method by way of the difference in frequency

(Method 1)

In Method 1, the average and standard deviation of the frequencies are sequentially obtained from the LBTM to the LTOP and the point where the frequency exceeds the value of (average AVR)+(standard deviation SD) $\times m_1$ is determined as the BSLN. The value of $m_1$ is a parameter which is empirically decided.

In Method 2, the difference between the frequencies is obtained from the LBTM to the LTOP and the point where the difference value exceeds the threshold value that is determined by (reference value) $\times m_2$ is set as the BSLN. The maximum frequency of the line is used as the reference value. The value $m_2$ is a parameter which is experimentally decided.

The values of the BSLN derived as the result of the execution when $m_1$ is set to 5 and $m_2$ is set to 0.3 are as shown in Table 2.

TABLE 2

| NUMBER OF CHARACTER LINES | BSLN | |
|---|---|---|
| | $M_1$ | $M_2$ |
| 1 | 36 | 36 |
| 2 | 78 | 78 |
| 3 | 120 | 120 |
| 4 | 161 | 161 |
| 5 | 205 | 204 |
| 6 | 247 | 246 |

Figures 7, 9:
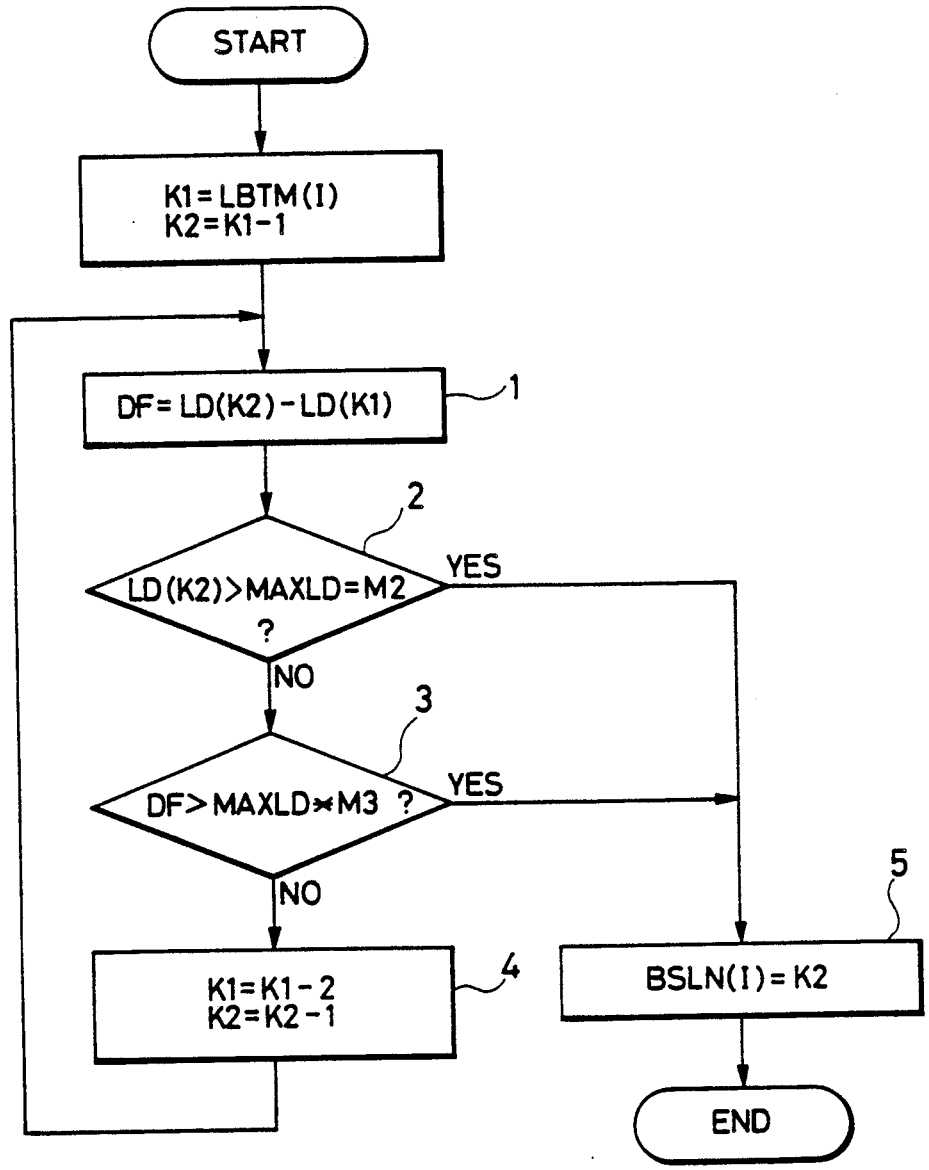
FIG. 7 is a diagram showing a base line (BSLN) obtained.
FIG. 9 is a flowchart to explain how to obtain the BSLN according to a Method 2.

The values of the BSLN derived by the above two methods are almost equal as shown in Table 2. When the base lines are written into the input image shown in FIG. 3-2 on the basis of the BSLN derived by Method 1 (M1), they are as shown in FIG. 7. It can be said that the proper base lines were written.

As another example, there can be a case where the LBTM and BSLN have to be made coincident depending on an input image. In consideration of such a case, in Method 1, if the BSLN is not determined even when the mesh line to be processed comes to the position corresponding to only $\frac{1}{2}$ of the height of the line upward from the LBTM during the tracing step of the frequency, the BSLN is decided to be the position of the LBTM. Although $\frac{1}{2}$ is the value which was appropriately determined, this value has to be at least over $\frac{1}{3}$. This is because, as shown in FIG. 3-2, although the line is divided into the regions I, II and III, the size in the y-axis direction in each region can be thought to be nearly equal.

(Method 2)

In Method 2, the threshold value (reference value) $\times m_3$ of the frequency is provided in addition to the difference value and when the frequency exceeds this threshold value, the mesh line at this time is determined as the BSLN. The value of $m_3$ is a parameter which is set such that $m_3 = m_2$ in this embodiment.

Next, the processes in the foregoing methods 1 and 2 will be explained with reference to flowcharts of FIGS. 8 and 9.

Figure 8:
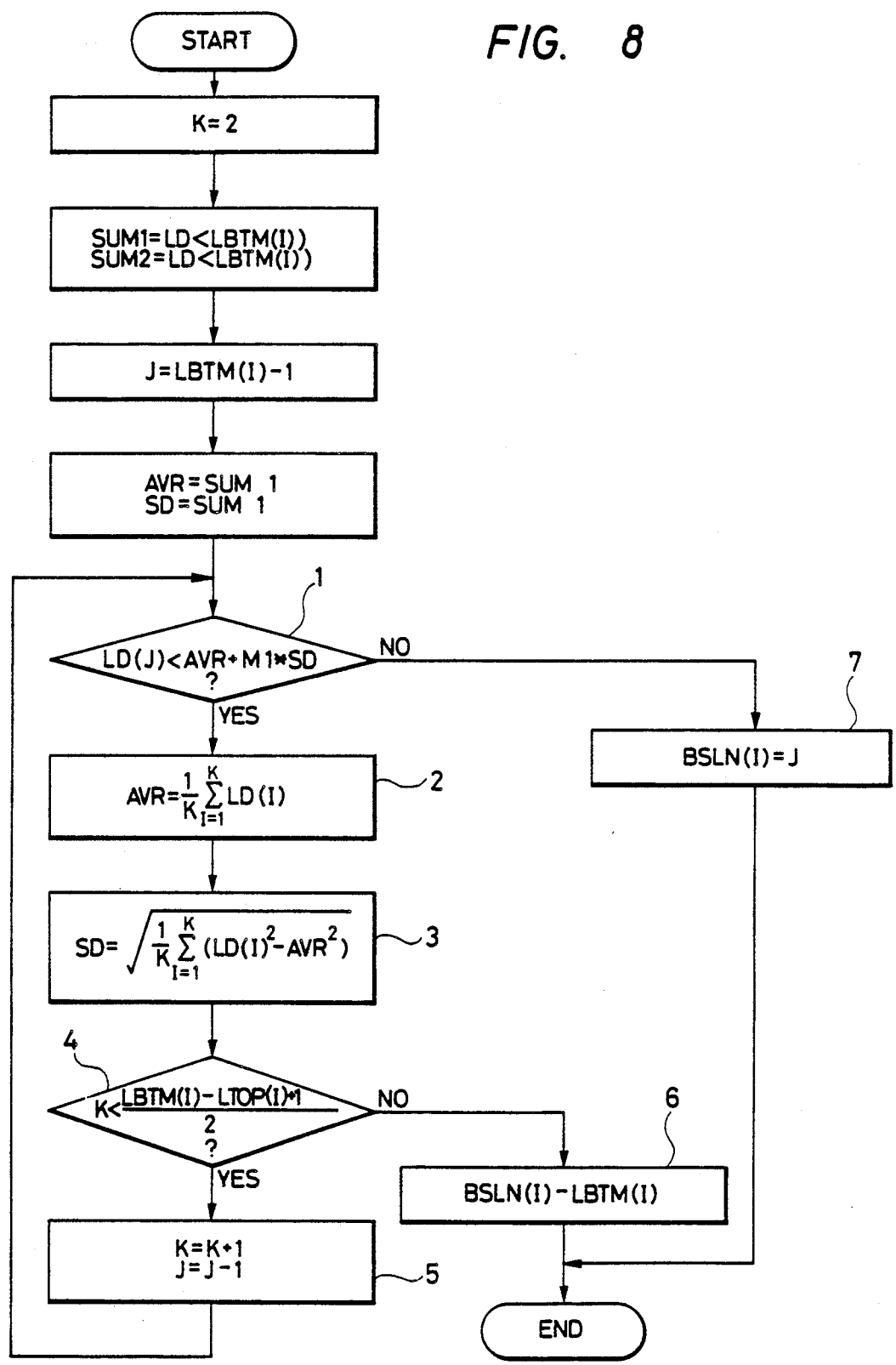
FIG. 8 is a flowchart to explain how to obtain the BSLN according to a Method 1.

FIG. 8 is the flowchart by way of the method 1. In this flow, a check is made sequentially from the (LBTM−1) pixel line to see if each character line is the BSLN or not by repeating the processing loop surrounded by steps 1 to 5.

First, in step 1, the value of which the standard deviation SD was increased by $m_1$ (M1 in the flowchart) times was added to the frequency average AVR is compared with the frequency of the J-th line, and when the frequency is equal to or larger than that value, the processing routine is branched to step 7, thereby allowing the J-th line to be stored as the BSLN. If not, the average AVR is obtained in step 2 and the deviation SD is derived in step 3 and these values are prepared for discrimination of the next (J−1)th line. Moreover, a check is made to see if the process was executed or not until the line of the height corresponding to $\frac{1}{2}$ of the character height of (LBTM−LTOP +1) in step 4. If the answer is NO in step 4, this means that the character a part of which appears at the position lower than the base line does not exist; therefore, the BSLN of that line is made equal to the LBTM in step 6.

The procedure of Method 2 will now be explained using FIG. 9. In step 1, from the (LBTM−1)th line, the difference DF in frequency between this line and the previous line is sequentially obtained. On the other hand, in the case where the frequency LD of the line to be processed is larger than the value of which a number $m_2$ (M2) in the flow chart was multiplied to the maximum frequency value MAXLD in the character line in step 2, this line is unconditionally determined to be the BSLN in step 5.

On one hand, in step 2, if the processing routine is branched to step 3, the value of the frequency deviation DF is compared with the value of M3 $\times$ MAXLD in step 3, and when the difference DF is larger, the routine is branched to step 5, so that this line is set as the BSLN. The above-mentioned processes are sequentially carried out for each pixel line. As described in detail in the above, the lines of the original image can be recognized according to the present invention. Therefore, a high grade word processing system can be provided. In addition, as well as the lines, if the system is constituted so as to recognize spaces between words, word lengths, and paragraphs, higher grade image processing can be performed (which will be explained later).

In this way, since the lines of the document image inputted can be recognized, it is possible to extract only a part of the document and to produce a new document. Also, by binarizing the sentence image read out and using a frequency distribution of the black mesh for every pixel line, the positions of the lines of the sentence can be accurately recognized.

The order of lines can be also rearranged. New lines can be inserted between lines. Any unnecessary lines can be deleted.

As described in detail in the above, by recognizing the lines while inputting a document as an image, as compared with the ordinary word processors or copying machines, extremely advanced rewriting, editing, and the like with a high operating efficiency can be performed.

Next, further another function, i.e., extraction of a word, of image processing will be explained.

For instance, like an original image shown in FIG. 10-1, the extraction of a word is performed by determining both of the left end (LEFT) and the right end (RIGHT) or the length (LENGTH) of the word and then giving the position of the base line (BSLN). The base line (BSLN) coincides with, for example, the y coordinate in the bottom portion of a capital letter in case of alphabets and is used as a reference of the movement position when characters are moved.

A word is recognized by detecting the foregoing three positions and storing them. Although various kinds of methods of determining the base line are considered, it can be decided in a manner such that, for instance, the line is obtained by way of the histogram of the number of black dots for every pixel line and further the average and standard deviation of the frequencies or the difference in frequency are derived. Its details are omitted here.

Next, a method of obtaining the foregoing positions LEFT and RIGHT using the base line and thereby extracting a word will be explained on the basis of the following steps.

STEP ① Extraction of a space between characters.
STEP ② Production of a frequency distribution for the length of the space.
STEP ③ Smoothing of the frequencies.
STEP ④ Determination of the threshold values of the length of the space between words and of the length of the space between characters in the word.
STEP ⑤ Extraction of the space between words.
STEP ⑥ Determination of the positions (LEFT, RIGHT) of the word.

FIG. 10-2A is an explanatory diagram of the lengths of the spaces between words and of the lengths of the spaces between characters. The lengths (Nos. 1, 4, 7) of the spaces between the words are apparently longer than the lengths (Nos. 2, 3, 5, 6) of the spaces between the characters in the words. Therefore, by taking out the relatively long space among the extracted spaces, the word can be extracted.

First, in STEP ①, the left ends (B) and right ends (E) and widths (SPW) of all spaces are derived (FIG. 10-2B)).

FIG. 10-3 is a diagram showing a projection of an image along an x axis. Denominations in the diagram will now be explained.

LTOP (Line Top) . . . The y coordinate of the mesh existing in the top portion among the black mesh in one line (a set of pixels determined to be black in the binarized image signal is hereinafter referred to as a black mesh).

LBTM (Line Bottom) . . . The y coordinate of the mesh existing in the bottom portion among the black mesh in one line.

PRx (Projection X-axis) . . . The projection of the image along the x axis.

(Extraction of a space between characters)

Determination of the values of B, E and SPW will then be explained on the basis of the above definitions.

The values of B, E and SPW are determined by first extracting the spaces between characters. A method of such determination is mainly divided into the following two steps.

STEP ①

The projection to the x axis of the black mesh in the region from the LTOP to the LBTM is obtained. In the case where one or more black meshes exist in the mesh from y =LTOP to y =LBTM in a certain coordinate x, PRx is set to 1 (PRx =1). On the contrary, when no black mesh exists, PRx =0.

STEP ②

For the PRx derived in STEP ①, the portion where PRx =0 continues is taken out and the x coordinate of the left end of this portion is set to $B_i$, while the x coordinate of the right end is set to $E_i$. The SPW is derived from the equation of ($SPW_i = E_i - B_i + 1$), where i is a number indicative of each space.

The foregoing processes in STEPs ① and ② will now be explained with reference to flowcharts. FIG. 11-1 is the flowchart for the processes in STEP ①. In steps 1 and 2, the process is repeated until the value of I becomes the maximum line number. In steps 3 and 4, the process is repeated from X =1 to the image width (WIDTH). In step 5, if there exists at least one portion where the value of the mesh is 1, PR(I,X) =1 in step 6. In step 7, the image is scanned until the Y goes from the LTOP to the LBTM. When all values of the meshes are 0 during the scanning of the image of the Y, the value of PR(I,X) becomes 0 in step 8. This operation is repeated until the X becomes from 1 to the image width and until the I becomes the maximum line number as described in the foregoing steps 1, 2 and 4. In the case where the projection PR(I,X) =0 in step 8, the following STEP ② will now be described.

FIG. 11-2 shows the flowchart for the processes in STEP ②. The process in step 1 is repeated until a predetermined line number similarly to the above. The process in step 2 is also repeated until the image width similarly to the above. When PR(I,X) =0 in step 3, if the PR(I,X−1) of the preceding x coordinate is 1 in step 4, the left end B(I,X) of the space is determined in step 5. On the contrary, when PR(I,X) =1 in step 3, if PR(I, X−1) =0 in step 6, the right end of the space is determined in step 7. From the results in steps 5 and 7, the space width (SPW) is decided in step 8 from the equation of LEN(I,K) =E(I,K)−B(I,K)+1. When the X exceeds the image width in step 2 at last, this x coordinate is decided to be the right end of the space in step 9. Then, the space width is determined in step 10. In the above explanation, M(Y,X) denotes the number of meshes at the point of the coordinates (Y,X); K is the space number; FL the value of $PR_{x-1}$; B(I,K) the left end of the K-th space of the I-th line; E(I,K) the right end of the K-th space of the I-th line; and LEN(I,K) the width of the K-th space of the I-th line.

STEP ② and STEP ③

(Now the production of the frequency distribution and the smoothing of the frequencies will be discussed)

FIG. 13-1 shows the result in the case where the above-described processes were carried out with respect to an original document shown in FIG. 12. FIG. 13-2 shows the frequency distribution obtained with respect to the values of the SPW in FIG. 13-1 in the manner as described in STEP ②. In the diagram, the frequency of which the SPW is 11 is the space adjacent to a small character such as a comma, a period or the like having a small character width and, accordingly, it has to be regarded as the space between characters in a word without being separated as one word. As described in the following STEP ③, for instance, when the smoothing process is performed by way of the three-class average, it will become a frequency distribution as shown in FIG. 13-3.

Thus, as described in the following STEP ④, it is possible to easily determine the threshold value to separate the space between characters in a word from the space between words.

STEP ④

Now, the determination of the threshold values will be discussed.

In determination of the threshold values, an attention is paid to the frequencies of the spaces between characters in a word in which there is a small variation in frequency distribution, and the changes of the frequencies are traced sequentially from the space width of 1 to a wide space width, and the points of the valleys where the frequency increases after it decreases are obtained. In the case where there exists a flat portion in the region from the reduced frequency point to the increased frequency point, the central value in this region is determined as the threshold value. In this way, the threshold value is decided to be 14, in FIG. 13-3. However, for instance, the width of the space between characters "1" and "1" of the number "11" is relatively wide, so that this space can be often regarded as the space between words. Therefore, to avoid the separation of "1" and "1" as the different two words, the following condition is added and the space between words is extracted.

Condition: In the case where three spaces each having a width over the threshold value continuously appear in one line, the second space is not regarded as the space between words.

This condition is adopted from the premise that "in an English sentence, two or more words each consisting of one letter never continuously appear."

STEP ⑤

Now the extraction of a space between words will be discussed.

Figure 14:
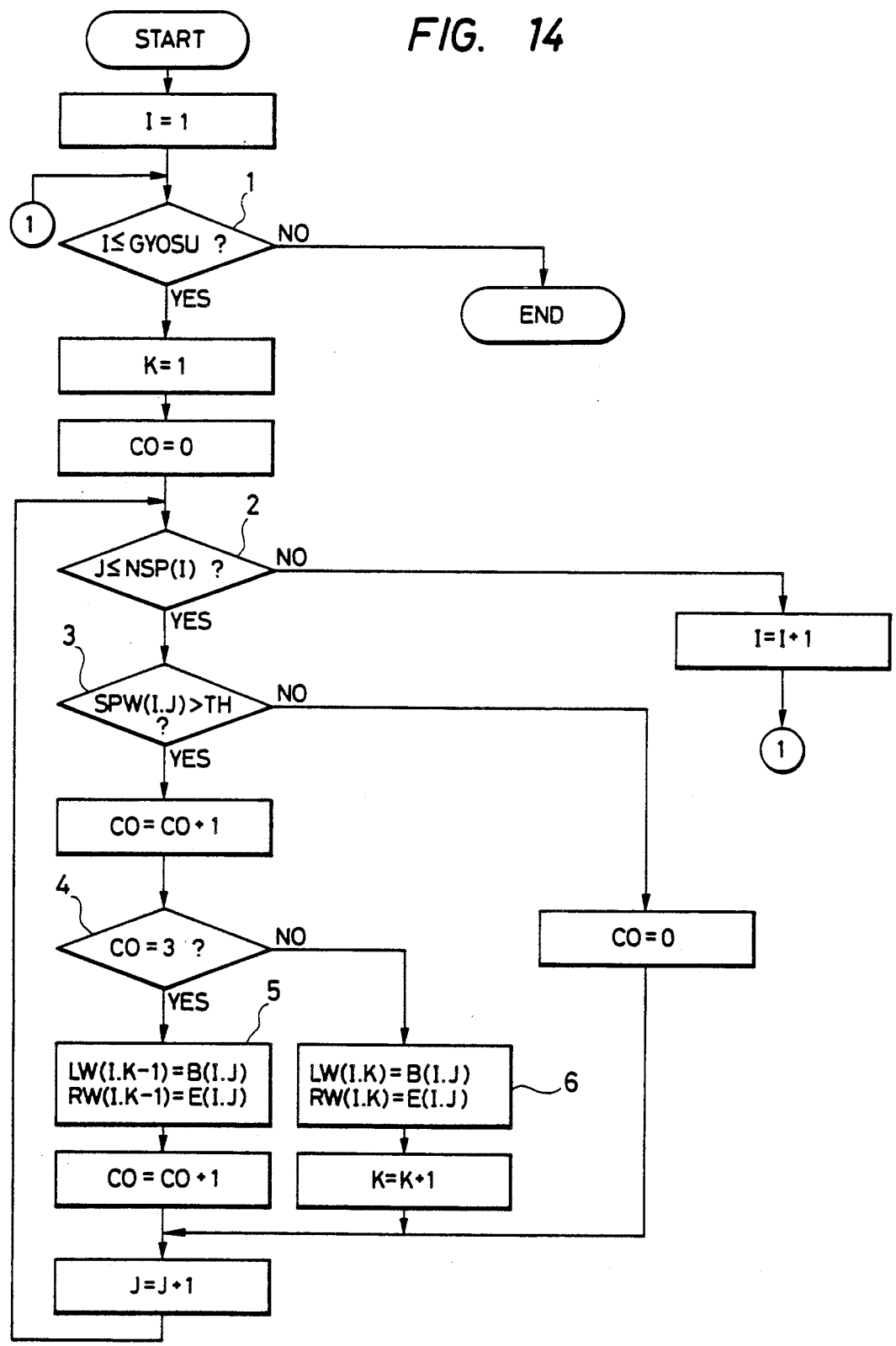
FIG. 14 is a diagram showing the operating process to extract the space between words.

The processes to extract the spaces between words from the spaces obtained as described above will then be explained with reference to a flowchart of FIG. 14.

In step 3, when the space width SPW is larger than the threshold value TH, there is a large possibility such that this space is the space between words. However, the second space over the threshold value among the three continuous spaces is the space in a word from the above-mentioned condition. In this case, therefore, the answer in step 4 is YES, so that the space is considered to be the preceding space in a word in step 5. In this flowchart, CO denotes the number of spaces which continuously appear. In the other cases, the space is regarded as the space between words. The above operation is performed with respect to the number of spaces in the line in step 2 and is also carried out with regard to the number of lines in step 1, respectively. In this way, the spaces between words can be extracted.

STEP ⑥

Now the determination of the LEFT end and RIGHT end of a word will be discussed.

In the following STEP ⑥ the following operations are performed for the space between words derived and the LEFT and RIGHT of the word are obtained.

Repeat the operations of STEPS ② and ③ until the line number i becomes the number of lines of the text.

Repeat the operation STEP ③ until the space j between words becomes [the number of spaces between words in the i-th line] − 1.

$LEFT_k \leftarrow RW(i,j)$ $RIGHT_k \leftarrow LW(i,j+1)$ $K \leftarrow K+1$ (LW: Left end of the space between words)

(RW: Right end of the space between words)

As described above, the constants LEFT, RIGHT and BSLN shown in FIG. 10-1 are obtained from the image shown in FIG. 12. The result is shown in FIG. 15-1. FIG. 15-2 shows the result of the division of the original of FIG. 12 into the words on the basis of the result shown in FIG. 15-1. As described in detail in the foregoing, the presence of word area can be recognized according to the invention. In case of inputting the original image, a processing unit to correct the gradient or the like of the original to the input unit may be provided.

As explained in detail in the foregoing, according to the invention, the presence of word areas in of the document inputted as an image can be recognized as information including commas, periods and the like, so that only a part of the document is extracted and the new document can be produced. Also, it is possible to rearrange the order of words and rewrite words and insert new words between words from the keyboard or the like (which will be explained later). The unnecessary words and characters can be deleted or the like. By recognizing the presence of word areas while inputting a document as an image, as compared with an ordinary word processor or a copying machine, extremely advanced rewriting, editing, retrieval, and the like with a high operating efficiency can be performed.

The case where the presence of character areas is recognized by way of the foregoing procedures are rewritten will next be described. To rewrite characters for an image text simultaneously with the rewriting of characters for a text using coded characters, the sample page of which the fonts of all characters to be used were printed has to be prepared as an image. This sample page is named as a font table. For this font table, the processes similar to those for the extraction of characters of the image text are carried out, thereby taking out the information (base line, left end, right end, etc.) representative of the region where each type exists. Further, in addition to the font table, a character code table is prepared and respective keys of the keyboard are made coordinate with the characters in the font table. The characters in the character code table are all coded characters, and each character is arranged at the same position of each of the corresponding characters in the font table. The character in the font table can be designated by the coordinates indicative of the position of the character in the character code table.

FIG. 16 shows an example of rewriting of characters in the image text, in which a method of inserting a character "b" into the text is illustrated.

First, "b" is designated by the keyboard. As the result of the search of the character code table in accordance with the internal code of "b", the coordinates (2,1) of "b" is obtained as shown in FIG. 16(A). The character at the position of the coordinates (2,1) is extracted from the font table and the image data is transferred to the designated position in the text, and the insertion of the character is completed as shown in FIGS. 16(B) and 16(C).

The sample text of FIG. 17 and the font table of FIG. 16(C) were actually produced using a typewriter and the rewriting editing of the characters was performed; the output results are shown in FIG. 8. FIG. 18(A) shows the output after the right alignment process of the sentence of the image text of FIG. 17 was performed. The rewriting process of characters is classified into three modes of deletion, rewriting and insertion (FIGS. 18(B), 18(C) and 18(d)). In the deletion mode of FIG. 18(B), "V" of "VLSI" is deleted. In the rewriting mode of FIG. 18(C), "V" of "VLSI" is changed to "U". In the insertion mode of FIG. 18(D), "0" is inserted into "[48]" to form "[408]".

Although the foregoing embodiment has been described with respect to the recognition and rewriting of mainly alphabetical characters, the similar recognizing processes can be also executed with regard to Japanese characters and the like.

On one hand, since the present invention makes it possible to recognize the presence of characters areas in the document inputted as an image, for instance, only a part of the document is extracted and the new document can be produced. It is also possible to rearrange the order of characters and insert new characters between characters and delete the unnecessary characters. Characters can be also rewritten. Further, by recognizing the presence of character areas while inputting the document as an image according to the invention, as compared with an ordinary word processor, the word processing for the existing type document makes it possible to perform extremely advanced rewriting, editing, retrieval, and the like with a high operating efficiency. Moreover, for instance, a character "b" inputted by the keyboard from among the inputted character information is searched in the text and the rewriting, insertion and deletion of the character may be executed automatically or by way of an input of an enter key indicative of the permission of the user. In this case, those operations may be performed by use of the display 25. This idea is an application of the concept of the back trace in a typewriter or the like.

Next, there will be described the recognition of paragraphs and hyphens in an image which is another function of the image processing system of the present invention. The flow of the processing procedure is classified into paragraph extraction, recognition of hyphens, calculation of the positions of the words after the line length conversion, and production of a new text due to the data copy.

(1) Paragraph extraction

The paragraph extraction consists of two STEPs ① and ②.

In STEP 1, the left edge LE of the image text is obtained.

Figure 19:
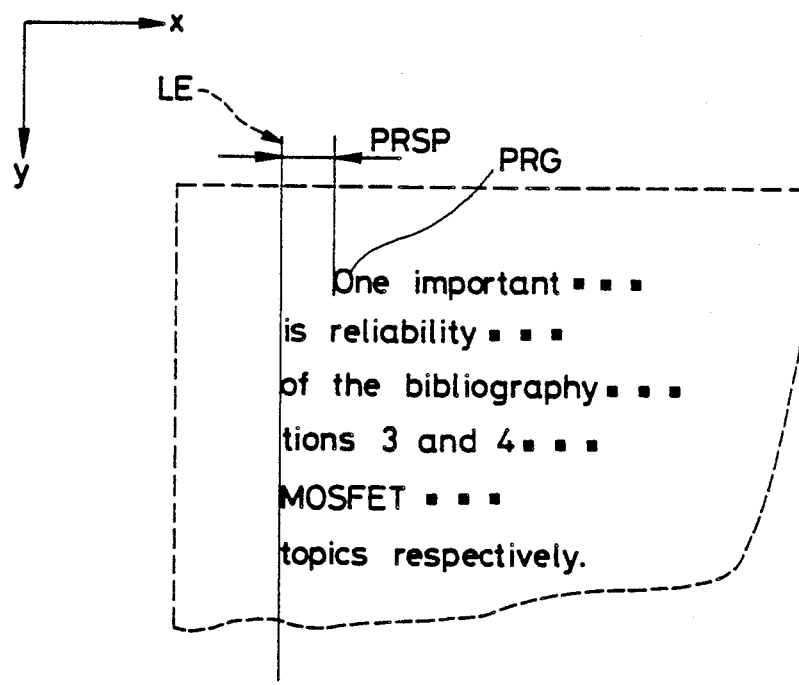
FIG. 19 is a diagram showing an example of an original image.
Figures 1, 20:
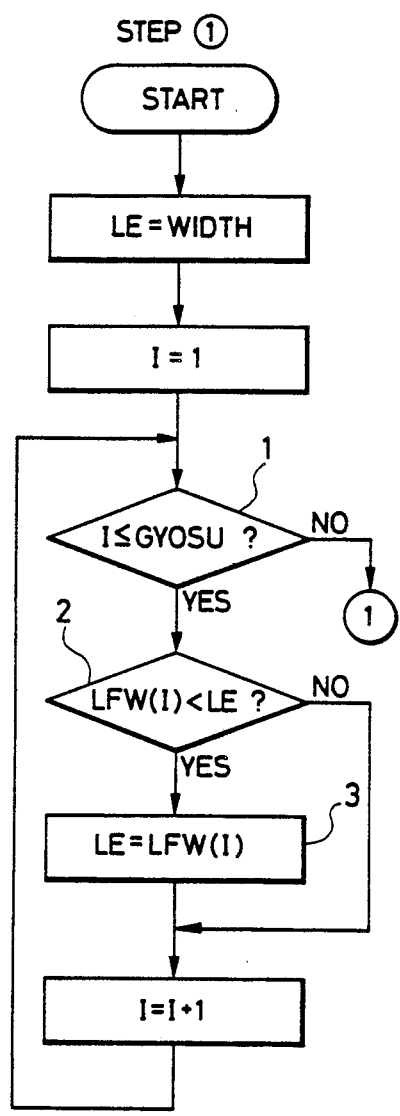
Figures 2, 20:
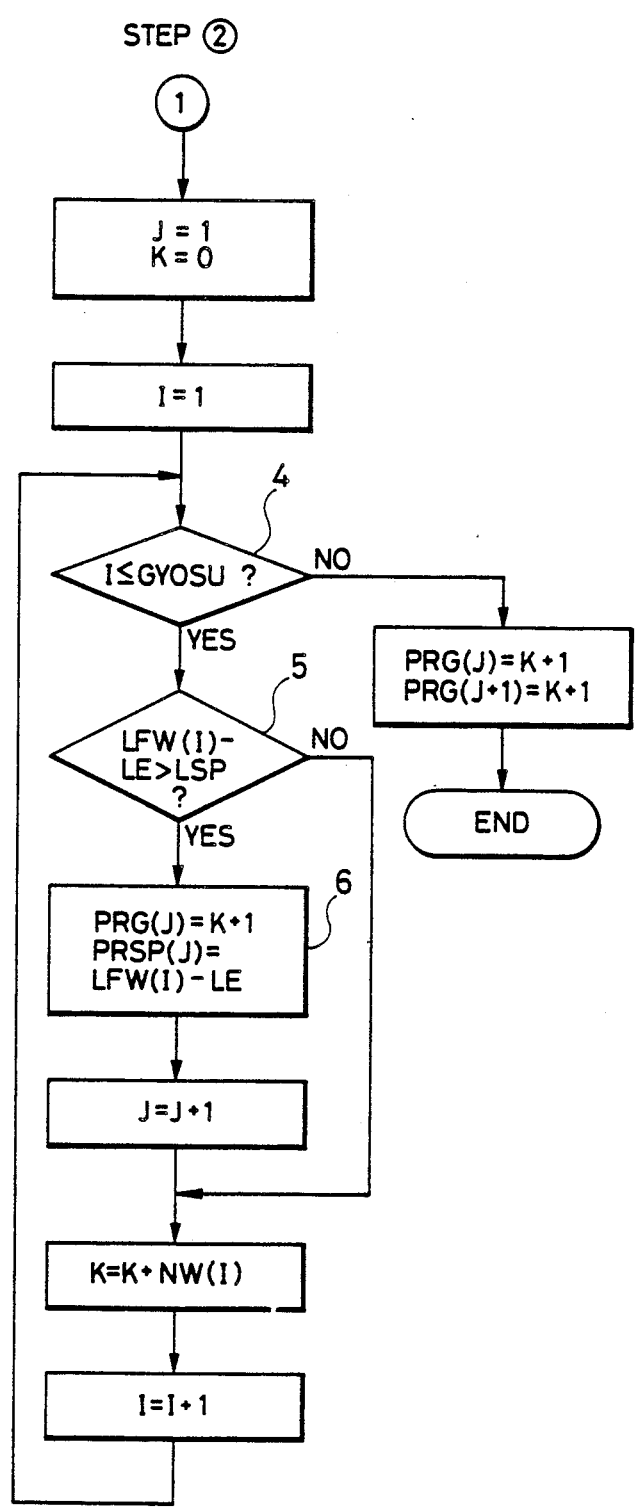

In STEP ② the first word in the paragraph is derived in dependence on the distance from the left edge. Since the blank portion exists in the beginning of the paragraph, when the distance between the left edge LE and the left end LEFT of the first word of each line is compared, the distance regarding the first word of the paragraph is larger than the other distances. By setting a threshold value of the distance and discriminating the difference between the distance and the threshold value, the paragraph can be extracted. This extracting process will now be explained with reference to an original image shown in FIG. 19. In the diagram, LE denotes the x coordinate of the black mesh which is located at the leftmost position in the image; PRG is the number of the first word of the paragraph; and PRSP is the length (ordinarily, as long as one word) of the space in the beginning of the paragraph. FIGS. 20-1 and 20-2 show flowcharts to obtain those values for extraction of the paragraph. In the flowcharts, I denotes the number of line which is being processed; WIDTH is the width of the image; LFW(I) is the left edge of the first word of the I-th line; J a variable; NW(I) the number of words of the I-th line; LSP the average of widths of the spaces between the words; PRG(J) the number of the first word of the paragraph; and PRSP(J) the length of the space in the beginning of the paragraph.

First with reference to FIG. 20-1, STEP ① will be described. When the LE in the line is larger than the left edge of the first word of the I-th line in step 2, the left edge of this line is set to LE in step 3. This operation is continued until the I becomes from 1 to the number of lines in step 1. Finally, the LE becomes equal to the left end of the image.

With reference to FIG. 20-2 STEP ② be explained. In step 5, if the distance from the left edge LE to the first word exceeds the average LSP of the widths of the spaces between words (this average is used as the threshold value), the beginning of this line is determined to be the paragraph. Then, the number PRG of the first word of the paragraph and the length of the space in the beginning are obtained as in step 6. This process is repeated until the I becomes from 1 to the number of lines in step 4. The number of paragraphs is expressed by J−1.

(2) Recognition of hyphens

Figures 21, 22:
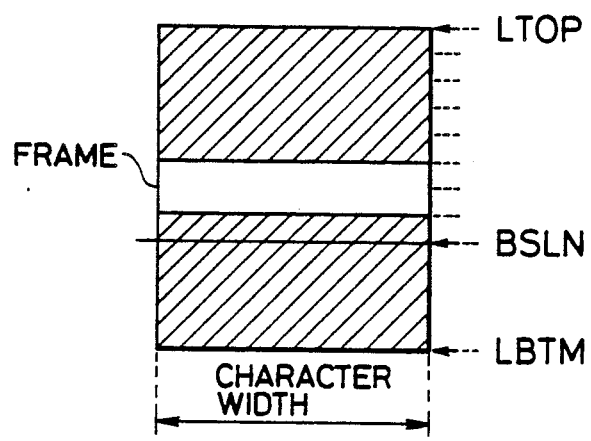
FIG. 21 is a diagram showing a word list.
FIG. 22 is an explanatory diagram of a method of detecting hyphens in a character frame.

Although various kinds of methods of extracting words are considered, for example, the positions of the word spaces can be recognized by the histogram of the white dot run length in the pixel line. It is assumed here that those positions have already been extracted. In a word list shown in FIG. 21, the word of "sections" in the third to fourth lines is extracted as different words if such extraction is performed. For such a work, for instance, in case of performing the line length conversion, it is considered that such a word having a hyphen appears at the position other than the last portion of the line. Since "sec-" and "tions" are inherently one word, the hyphen has to be recognized before performing the line length conversion and this hyphen has to be removed upon conversion.

Although various kinds of recognizing methods are considered, since the hyphen has a simple shape, it can be discriminated from the condition such that a rectangle of a proper size is imagined at an appropriate position for the last character of each line of the text and no black mesh exists in the region (hatched portions in FIG. 22) other than the frame of the rectangle. This frame is set to the position in the diagram among the scales of which the regions from the LTOP to the base line were divided into eight equal parts. The denominations in FIG. 22 will now be explained.

LTOP (Line Top) . . . The y coordinate of the mesh existing in the top portion in the black mesh (a set of the pixels determined to be black in the binarized image signal is hereinafter referred to as a black mesh) in one line.

LBTM (Line Bottom) . . . The y coordinate of the mesh existing in the bottom portion in the black mesh in one line.

BSLN (Base Line) . . . The base line which coincides with the y coordinate in the bottom portion of the alphabetic capital letters.

(3) Detection of the positions of the words

The line length conversion is the operation to arbitrarily designate the lateral width of the text and to rearrange the words so as not to exceed the range of the lateral width.

Figures 1, 23:
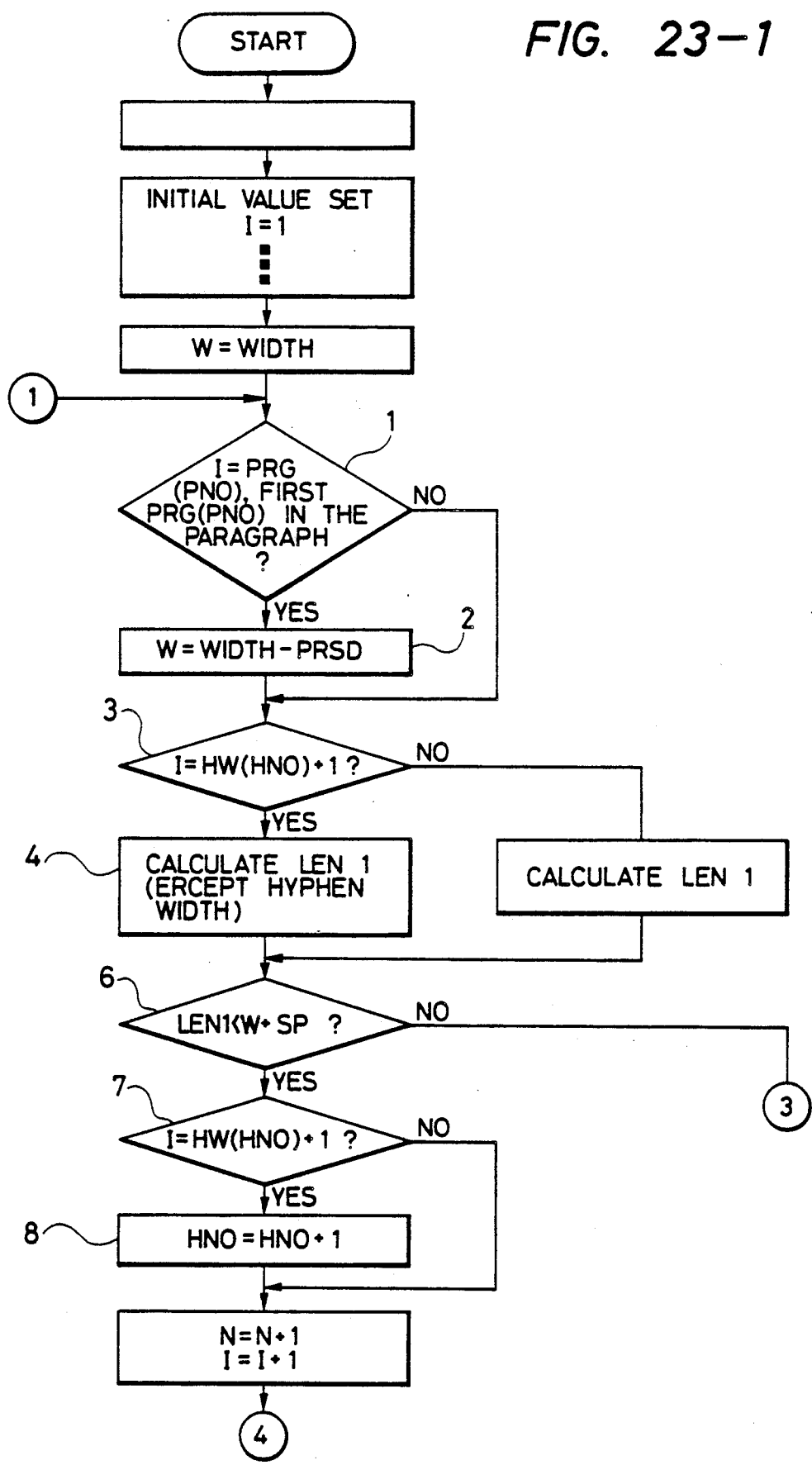
Figures 2, 23:
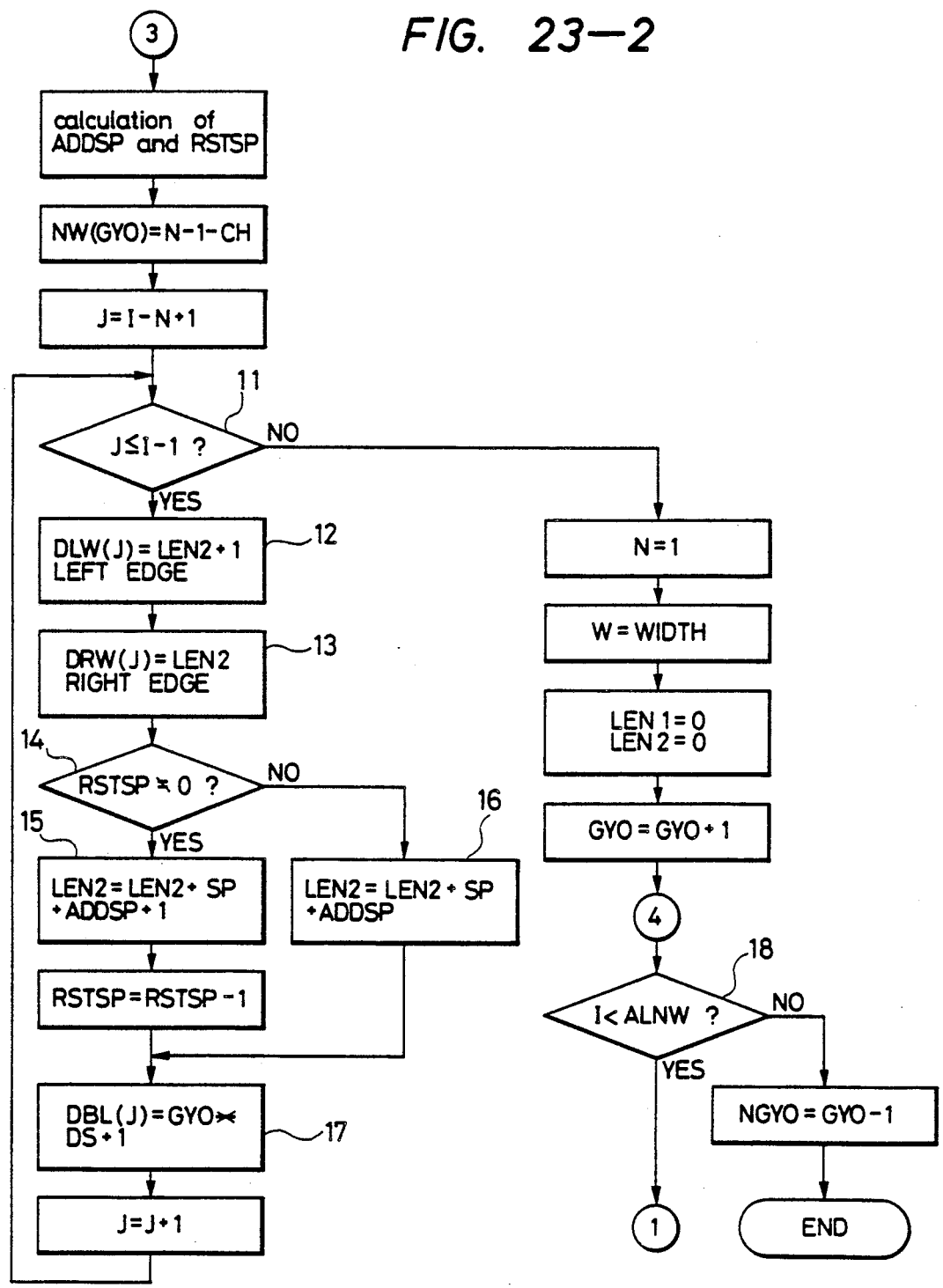

FIGS. 23-1 and 23-2 show algorithms to calculate and obtain the positions of the words after the conversion. In the flowcharts, WIDTH denotes the line length of the image; I and J are word numbers; N the number of words which can be inserted in the line; GYO the line number; NGYO the line number after the line length conversion; ALNW the number of all words; PNO the paragraph number; HNO the number of hyphens (according to the sequence of appearance); HW(HNO) the word number having the hyphen; CH the number of hyphens removed; DS the distance between the base lines; NW(GYO) the number of words in a line; $LEN_1$ the sum of the lengths each consisting of the word width and the SP; $LEN_2$ the sum of the lengths each consisting of the word width, SP, ADDSP, and RSTSP; ADDSP the length which is certainly added to each space SP between words; RSTSP the length which is added to some of the SP; DLW(J) the left end of each word; DRW(J) the right end of each word; DBL(J) the base line of each word; and W the text width (length of line) which is equal to WIDTH - PRSP at the paragraph and is equal to WIDTH in other cases.

The text width is set to WIDTH and the new position of the word is obtained at the position where the left edge is DLW and the right edge is DRW and the base line is DBL. Fundamentally, the following processes are performed.

(a) Calculation of the $LEN_1$ (refer to FIG. 24)

In this process, a calculation is made with respect to each line to see how many words can be inserted within the range of the text width newly set.

The space SP of the length which is thought to be the minimum length needed for the interval between words (in the program, the length of three times longer than the average width of the spaces between characters in the word is used as the SP) is added to the length of each word and the sum of the lengths of all SP is set to the $LEN_1$. In FIG. 24, N indicates the number of words.

$$LEN_1 \leftarrow LEN_1 + [\text{Length of the word}] + SP$$

When the $LEN_1$ exceeds the set length W, the word which was finally added (in the diagram, the (N+1)th word) is removed. Although the value of W equals WIDTH except the first line of the paragraph, the blank has to be provided in the beginning in case of the first line of the paragraph; therefore, the W is set to WIDTH − PRSP. PRSP is the length of the space in the beginning of the paragraph.

(b) Calculation of the ADDSP and RSTSP

If it is decided that N words can be inserted in the line, the distance γ from the right edge of the N-th word to the WIDTH is calculated. By distributing the γ to the distances between the respective words, the right alignment of the sentence is performed.

The ADDSP is the length which is certainly added to each space SP between words. RSTSP is the sum of the lengths which are added to some of the SPs valves. The relation among the γ, ADDSP and RSTSP is such that $$\gamma = ADDSP \times (N-1) + RSTSP$$

(c) Calculation of the $LEN_2$ (refer to FIG. 25)

The length which is determined by the SP, ADDSP and RSTSP is set between the words and the new position of each word is determined. The following calculations are executed from the first word to the N-th word of the line, thereby deriving the DLW and DRW.

$DLW_{k+n-1} \leftarrow LEN_2 + 1$     (i)

$LEN_2 \leftarrow LEN_2 + (\text{length of the } (k + n - 1)th \text{ word})$     (ii)

$DRW_{k+n-1} \leftarrow LEN_2$     (iii)

When $RSTSP \neq 0$, $LEN_2 \leftarrow LEN_2 + SP + ADDSP + 1$     (iv)
When $RSTSP = 0$, $LEN_2 \leftarrow LEN_2 + SP + ADDSP$ If $RSTSP \neq 0$, then $RSTSP \leftarrow RSTSP - 1$     (v)

The initial value of the $LEN_2$ is PRSP in the first line of the paragraph and is 0 in the other lines.

The foregoing calculation of the $LEN_1$ in (a) will then be described with reference to FIG. 3-1. In steps 1 and 2, if the number I of the word which is being processed is the first word number PRG(PNO) of the paragraph, the W is set to the value of which the space PRSP in the beginning of the paragraph was subtracted from the length set. In next steps 3, 4 and 5, if the word to be processed is the next word of the hyphen, the width of the hyphen is removed from the calculation result of the $LEN_1$. Then, in step 6, when the $LEN_1$ is smaller than the set value, step 7 follows. In case of the hyphen, the number of hyphens is increased in step 8.

The foregoing calculations of the ADDSP and RSTSP in (B) will now be explained with reference to FIG. 23-2.

When the answer is NO in step 6 in FIG. 23-1, the processing routine is jumps to the flowchart of FIG. 23-2. In step 11, the following operations are repeated until the word becomes the last word in the line. The left and right edges of the word are respectively decided in steps 12 and 13. A check is made to see if there is a length (RSTSP) to be added or not in step 14. If there is the extra length (YES in step 14), the result in step 15 is larger than the result in step 16 by 1. Then, the value of the RSTSP is decreased by 1. In step 17, the base line of the line is given to each word. If the processing routine is jumped from step 11 (namely, when the answer is NO in step 1) by repeating the foregoing operations, the initialization is again performed and the processing routine advances to 4.

The above-mentioned calculations of (a) and (b) slightly differ between the last line of the paragraph and the line in which the next word of the word including the hyphen (corresponding to "tions" in FIG. 1) appears. Since there is no need to execute the right alignment in the last line of the paragraph, the distance of only the SP is given between the respective words as shown in FIG. 26. Therefore, it is unnecessary to perform the calculations of the ADDSP and RSTSP in (b). In the calculation of the $LEN_2$ in (c) as well, step 16 in FIG. 23-2 becomes $$LEN_2 \leftarrow LEN_2 + SP$$

Figure 27:
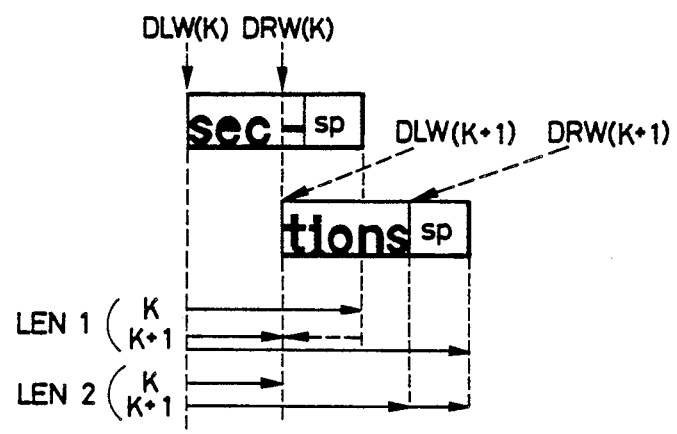
FIG. 27 is a diagram showing changes of the LEN1 and LEN2.

In the line in which the next word of the word including the hyphen appears, in order to allow these two words to seemingly become one word from which the hyphen was removed when they are outputted, it is considered such that the RIGHT of the word including the hyphen is located before the hyphen and at the same time no space is added after the word including the hyphen. Therefore, the changes of the $LEN_1$ and $LEN_2$ become as indicated by arrows in FIG. 27.

(4) Production of the image text after the line length conversion

Figure 28:
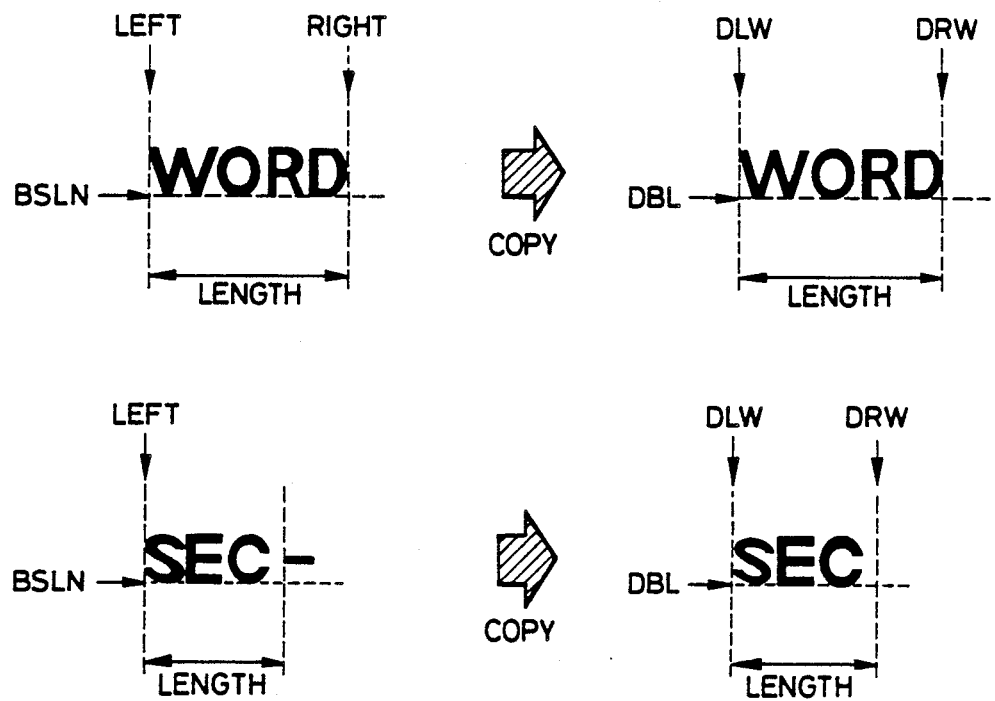
FIG. 28 is an explanatory diagram of the copying operation in case of a word including a hyphen.

The image data of the words in the original text is copied to the new position of the text. The position in the source region of each word is determined on the basis of the LEFT, BSLN and LENGTH. The position in the region where the image is copied is determined by way of the DLW, DRW and DBL (refer to FIG. 28). The LENGTH is obtained by the equation of LENGTH = DRW − DLW + 1. When the LENGTH is decided from the positions on both ends of the word on the side where the image is copied, in case of the word including the hyphen, this hyphen is not copied.

As described above, the original image shown in FIG. 21 is accurately line length converted as shown in, for example, FIGS. 29-1 and 29-2.

The paragraph of the document can be recognized according to the invention. Therefore, for example, it is possible to extract only a part of the document and produce the new document, or to rearrange the order of the paragraphs, or to insert a new paragraph between paragraphs. Any unnecessary paragraphs can be deleted. In addition, the documents of irregular sizes such as a newspaper or the like can be rearranged.

Further, according to the invention, by recognizing the paragraphs while inputting the document as an image, as compared with an ordinary word processor, the word processing to the existing type document makes it possible to perform extremely advanced rewriting, editing, retrieval, and the like with a high operating efficiency.

Also, it is possible to provide an image processing system having a high grade editing function in which the first image information from the keyboard and the second image information from the image reader can be processed at the same level, for instance, as the image (pixel) data or code data.

We claim:

1. An image processing system comprising:
input means for inputting document information including a plurality of lines;
converting means for converting the document information inputted by said input means into dot information;
removing means for comparing the height of dot information corresponding to respective ones of said lines with a predetermined value, and, in the case that the height is smaller than the predetermined value, for designating the line as spurious and for removing the line;
detecting means for detecting character string information in the plurality of lines of the document information from which the designated line has been removed by said removing means;
memory means for storing the character string information detected by said detecting means; and
editing processing means for changing the positional structure of the character strings comprising the plurality of lines the document formation in response to the character string information stored in said memory means.

2. An image processing system according to claim 1, wherein said detecting means detects each of the lines, and a base line of each of said lines in response to the change of histogram data in a first direction along said lines, and detects a position of a paragraph, a character area, a space between adjacent two characters, word area and a space between adjacent two words of each of said lines in response to the change of histogram data in a second direction normal to said first direction.

3. An image processing system according to claim 2 wherein said processing means includes means for rearranging said paragraph, said word and said character, the deletion of said word and said character, the insertion of said word and said character and the exchange of the length of said lines.

4. An image processing system according to claim 1, wherein said input means comprises an image reader which scans character strings in a direction along the lines of said character strings composing a document, in order to optically input said document information.

5. An image processing system according to claim 1, further comprising memory means for storing said document information input by said input means, as font data.

6. An image processing system according to claim 1, wherein said detecting means sets a predetermined frame for each line of said character strings in order to detect hyphenation, in response to said dot information existing in said frame.

7. An image processing system comprising:
input means for inputting, as dot information, document information including a plurality of lines comprising character strings;
removing means for comparing the height of dot information corresponding to respective ones of said lines with a predetermined value, and, in the case that the height is smaller than the predetermined value, for designating the line as spurious and for removing the line;
calculating means for generating and outputting histogram data of the dot information of the document information from which the designated line has been removed by said removing means;
detecting means for detecting a base line of each of the character strings in response to a frequency average and a standard deviation of the histogram data outputted from said calculating means; and
processing means for changing the structure of the character strings of the document information using the base line detected by said detecting means as a reference.

8. An image processing system according to claim 7, wherein said input means comprises an image reader which scans said character strings in a direction along the lines of said character strings, in order to input said dot information.

9. An image processing system comprising:
    input means for inputting, as dot information, document information including a plurality of lines;
    removing means for comparing the height of dot information corresponding to respective ones of said lines with a predetermined value, and, in the case that the height is smaller than the predetermined value, for designating the lines as spurious and for removing the line;
    calculating means for generating and outputting histogram data of the dot information of the document information from which the designated line has been removed by said removing means;
    detecting means for detecting a base line of each of the character strings in response to a difference in frequency of the histogram data output from said calculating means; and
    processing means for editing the structure of the character strings of the document information using the base line detected by said detecting means as a reference.

10. An image processing system according to claim 9, wherein said input means comprises an image reader which scans said character strings in a direction along the lines of said character strings, in order to input said dot information.

* * * * *

UNITED STATES PATENT AND TRADEMARK OFFICE
CERTIFICATE OF CORRECTION

PATENT NO. : 5,003,614
DATED : March 26, 1991
INVENTOR(S) : YUZURU TANAKA, ET AL.

It is certified that error appears in the above-identified patent and that said Letters Patent is hereby corrected as shown below:

SHEET 11

FIG. 12, "New Yark," should read --New York,--.

SHEET 15

FIG. 15-2, "Yark," should read --York,--.

COLUMN 1

Line 19, "2. DESCRIPTION OF THE PRIOR ART" should read --2. Description of the Prior Art--.

Line 27, "processing" should read --processing,--.

Line 38, "images.," should read --images;--.

COLUMN 2

Line 67, "STEP ① extraction" should read --STEP ① for extraction--.

COLUMN 3

Line 1, "extraction" should read --for--.

Line 9, "FIG. 13-1 and 13-3" should read --FIG. 13-3--.

Line 19, "FIG. 16 A-C" should read --FIGS. 16A to 16C--.

UNITED STATES PATENT AND TRADEMARK OFFICE
CERTIFICATE OF CORRECTION

PATENT NO. : 5,003,614

DATED : March 26, 1991

INVENTOR(S) : YUZURU TANAKA, ET AL.

It is certified that error appears in the above-identified patent and that said Letters Patent is hereby corrected as shown below:

COLUMN 3

Line 56, "well a" should read --well as a--, and "image" should read --image,--.

COLUMN 4

Line 2, "photo sensing" should read --photosensing--.

Line 13, "photo sensitive" should read photosensitive--.

Line 22 "photo sensing" should read --photosensing--.

Line 68, "a hand" should read --hand--.

COLUMN 5

Line 19, "(step A)" should read --(STEP-A)--.

Line 45, "LF" should read --FL--.

COLUMN 6

TABLE 1, "4   96 -" should read --4   96 -   126   31--.

COLUMN 6

Line 45, "to spurious." should read --to be spurious are removed.--.

Line 53, close up right margin.

UNITED STATES PATENT AND TRADEMARK OFFICE
CERTIFICATE OF CORRECTION

PATENT NO. : 5,003,614
DATED : March 26, 1991
INVENTOR(S) : YUZURU TANAKA, ET AL.

It is certified that error appears in the above-identified patent and that said Letters Patent is hereby corrected as shown below:

COLUMN 6

Line 64, close up left margin.

Line 67, "i," should read --j,--.

COLUMN 7

Line 9, "made coincide" should read --made to coincide--.

COLUMN 7

TABLE 2, $-- \dfrac{BSLN}{M_1 \qquad\qquad M_2}--$.

should read $-- \dfrac{BSLN}{m_1 \qquad\qquad m_2}--$.

COLUMN 8

Line 20, "($M_1$" should read (M1--.

COLUMN 8

Line 43, "(M2) in the flow chart" should read --(M2 in the flow chart)--.

UNITED STATES PATENT AND TRADEMARK OFFICE
CERTIFICATE OF CORRECTION

PATENT NO. : 5,003,614
DATED : March 26, 1991
INVENTOR(S) : YUZURU TANAKA, ET AL.

It is certified that error appears in the above-identified patent and that said Letters Patent is hereby corrected as shown below:

COLUMN 10

Line 4, "then" should read --now--.

Line 65, "(Now" should read --Now--.

Line 66, "discussed)" should read --discussed.--.

COLUMN 11

Line 51, no new paragraph.

Line 52, "then" should read --now--.

COLUMN 12

Line 5, no new paragraph.

Line 10, "operation" should read --operation of--.

Line 29, "area" should read --areas--.

Line 35, "of" (second occurrence) should be deleted.

COLUMN 13

Line 10, close up right margin.

Line 11, close up left margin.

Line 23, "18(d))." should read 18D)).--.

UNITED STATES PATENT AND TRADEMARK OFFICE
CERTIFICATE OF CORRECTION

PATENT NO. : 5,003,614

DATED : March 26, 1991

INVENTOR(S) : YUZURU TANAKA, ET AL.

It is certified that error appears in the above-identified patent and that said Letters Patent is hereby corrected as shown below:

COLUMN 14

Line 1, "STEP 1," should read --STEP ①,--.

Line 36, "FIG. 20-2 STEP ② be" should read --FIG. 20-2, STEP ② now will be--.

Line 56, "work," should read --word,--.

COLUMN 16

Line 14, "SPs valves." should read --SPs values.--.

Line 39, "then" should read --now--. and FIG. 3-1." should read --FIG. 23-1.--.

Line 55, "is" should be deleted.

Line 65, "is jumped" should read --jumps--.

Line 66, "step 1) should read --step 11)--.

UNITED STATES PATENT AND TRADEMARK OFFICE
CERTIFICATE OF CORRECTION

PATENT NO. : 5,003,614

DATED : March 26, 1991

INVENTOR(S) : YUZURU TANAKA, ET AL.

It is certified that error appears in the above-identified patent and that said Letters Patent is hereby corrected as shown below:

COLUMN 18

Line 15, "the document formation" should read --of the document information--.

Signed and Sealed this

Eighth Day of December, 1992

Attest:

DOUGLAS B. COMER

Attesting Officer

Acting Commissioner of Patents and Trademarks